(12) United States Patent
Nakata et al.

(10) Patent No.: US 6,984,948 B2
(45) Date of Patent: Jan. 10, 2006

(54) MOTOR CONTROL APPARATUS

(75) Inventors: Hideki Nakata, Shijounawate (JP);
Mitsuo Ueda, Nishinomiya (JP); Hideo Matsushiro, Kusatsu (JP); Masanori Ogawa, Kusatsu (JP); Mitsuo Kawaji, Kusatsu (JP); Tomohiro Sugimoto, Kusatsu (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/734,752

(22) Filed: Dec. 10, 2003

(65) Prior Publication Data

US 2004/0124807 A1    Jul. 1, 2004

(30) Foreign Application Priority Data

Dec. 12, 2002 (JP) .............................. 2002-361156
May 30, 2003 (JP) .............................. 2003-154938

(51) Int. Cl.
*H02P 6/18* (2006.01)
(52) U.S. Cl. .................. 318/254; 318/721; 318/722
(58) Field of Classification Search ............... 318/138, 318/254, 376, 439, 720–724
See application file for complete search history.

(56) References Cited

U.S. PATENT DOCUMENTS

| | | | | |
|---|---|---|---|---|
| 3,949,283 A | * | 4/1976 | Okuyama et al. ........... | 318/138 |
| 4,810,943 A | * | 3/1989 | Kawaguchi et al. ........ | 318/434 |
| 5,457,375 A | * | 10/1995 | Marcinkiewicz et al. ... | 318/802 |
| 5,777,447 A | * | 7/1998 | Okano ........................ | 318/434 |
| 6,388,416 B1 | * | 5/2002 | Nakatani et al. ............ | 318/700 |
| 6,534,948 B2 | * | 3/2003 | Ohura et al. ................ | 318/798 |
| 6,828,752 B2 | * | 12/2004 | Nakatsugawa et al. ..... | 318/801 |

FOREIGN PATENT DOCUMENTS

| | | |
|---|---|---|
| JP | 09-74790 A | 3/1997 |
| JP | 10150795 A | 6/1998 |

OTHER PUBLICATIONS

Takaharu Takeshita et al., "Back EMF Estimation-Based Sensorless Salient-Pole Brushless DC Motor Drives", *T.IEE Japan*, vol. 117-D, No. 1, pp. 98-105, (1997).

P. Foussier, "Contribution à l'integration des systèms de commande des machines électriques à courant alternative", *Insa De Lyon*, pp. 157-166, (1998).

\* cited by examiner

*Primary Examiner*—Bentsu Ro
(74) *Attorney, Agent, or Firm*—Akin Gump Strauss Hauer & Feld, LLP

(57) ABSTRACT

In a motor control apparatus of the present invention, a control section which receives an input voltage to an inverter circuit, a motor current flowing to a brushless motor and a motor current command value indicating the value of a current required to flow to the inverter circuit, and controls the inverter circuit by maintaining a phase of the voltage applied to the brushless motor when the value of the input voltage to the inverter circuit is smaller than the value of a voltage required to be applied to the brushless motor.

24 Claims, 35 Drawing Sheets

F I G. 4A
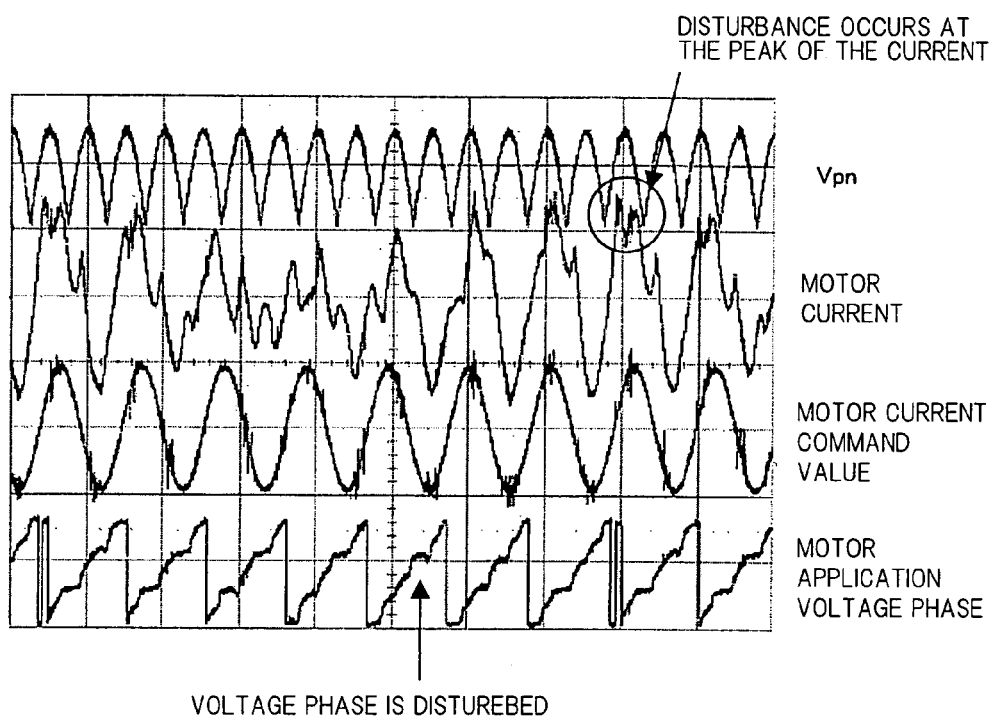

Vpn

ESTIMATED
PHASE

ESTIMATED PHASE IS DISTORTED
WHEN Vpn IS SMALL

ESTIMATED PHASE IS PROPER EVEN
WHEN Vpn IS SMALL

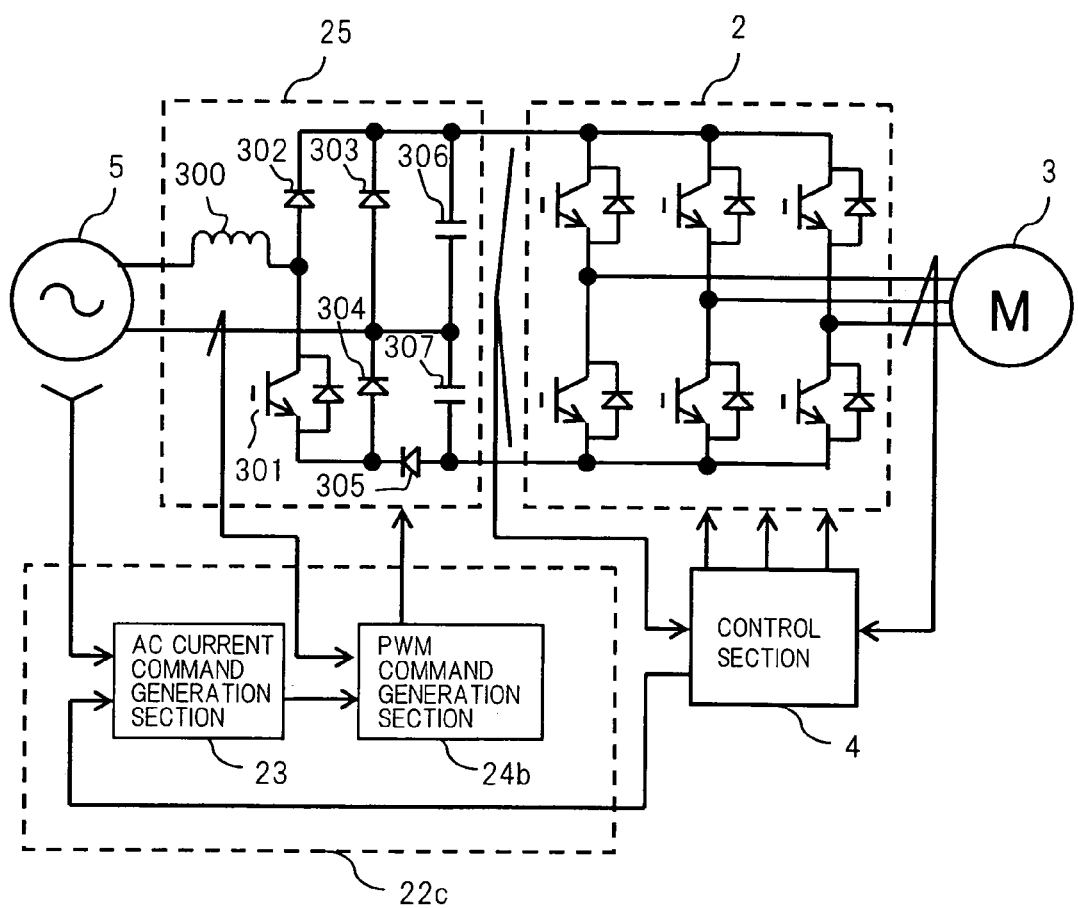
F I G. 2 3 A

F I G. 2 5
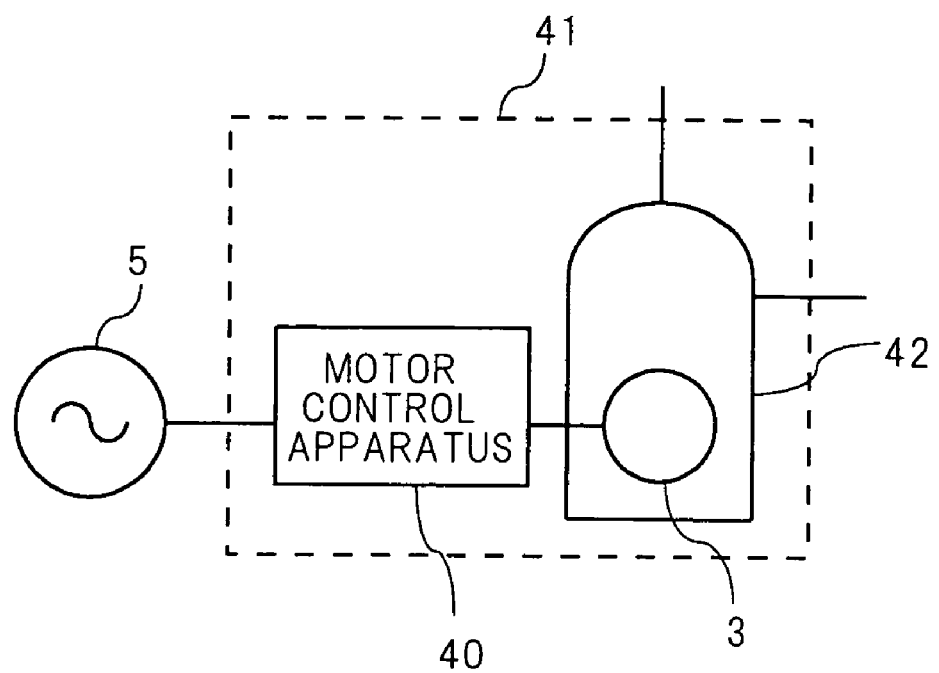

MOTOR CONTROL APPARATUS

BACKGROUND OF THE INVENTION

The present invention relates to a motor control apparatus for controlling brushless motors incorporated in air conditioners, refrigerators, washing machines, blowers, etc. by using an inverter circuit.

FIG. 33 is a block diagram showing the configuration of a conventional motor control apparatus for driving a brushless motor. In the following descriptions, the conventional motor control apparatus shown in FIG. 33 is referred to as a first conventional technology. In FIG. 33, numeral 101 designates an AC power source, numeral 102 designates an inductor, numeral 103 designates a rectifying diode, numeral 104 designates a smoothing capacitor, numeral 106 designates an inverter circuit, numeral 107 designates a brushless motor, and numeral 108 designates a position sensor. In the case when the AC voltage supplied from the AC power source 101 is converted into a DC voltage by using the rectifying diode 103 and the smoothing capacitor 104 so that a DC power is input to the inverter circuit 106, the current supplied from the AC power source 101 flows only when the voltage of the smoothing capacitor 104 is lower than the supplied AC voltage. Hence, the current supplied from the AC power source 101 has harmonic components. Hence, in the first conventional technology, the inductor 102 is provided between the AC power source 101 and the rectifying diode 103 to reduce the harmonic components and to improve power factor. As described above, in addition to the rectifying diode 103, the inductor 102 and the smoothing capacitor 104 are used in the rectifying circuit 105 of the first conventional technology. Furthermore, in the case when the brushless motor 107 is driven by the inverter, the rotation angle information of the rotor is necessary. For this purpose, in the first conventional technology, the rotation angle was detected by using the position sensor 108. As an example of this first conventional technology, a motor control apparatus disclosed in Japanese Laid-open Patent Application No. Hei 9-74790 is proposed.

The inductor 102 and the smoothing capacitor 104 of the rectifying circuit 105 for use in the first conventional technology are large components having a large inductance and a large capacitance, respectively, in many cases. As a result, the conventional motor control apparatus is frequently apt to be large in size and high in price. In the field of motor control apparatuses, a rectifying circuit incorporating compact components like an inductor having a small inductance and a capacitor having a small capacitance or a rectifying circuit not incorporating these components has been demanded from the viewpoint of making the apparatus smaller in size and lower in cost.

In this situation, such a motor control apparatus incorporating neither inductor nor smoothing capacitor as shown in FIG. 34 is proposed as a second conventional technology. As an example of this second conventional technology, a motor control apparatus disclosed in Japanese Laid-open Patent Application No. Hei 10-150795 is proposed. Since no smoothing capacitor is used in the second conventional technology, the input voltage supplied to the inverter circuit 106 is not a DC voltage but a pulsating voltage. If this kind of pulsating voltage is input to the inverter circuit 106, when the input voltage supplied to the inverter circuit 106 is low, the inverter circuit 106 cannot generate a desired voltage to be applied to the brushless motor 107 in some cases. In the case when the desired voltage cannot be obtained by the second conventional technology, the phase of the voltage to be applied to the brushless motor 107 is advanced. By advancing the phase of the voltage to be applied to the brushless motor 107, the so-called weak field state can be obtained, whereby the voltage required to be applied to the brushless motor 107 can be made lower. Hence, with the second conventional technology, the brushless motor 107 can be driven continuously even when the input voltage supplied to the inverter circuit 106 is low. However, in the second conventional technology, in the case when the input voltage supplied to the inverter circuit 106 becomes a predetermined value or less, the switching operation of the inverter circuit 106 is stopped. This is because motor drive in the weak field state is limited. As described above, the second conventional technology is configured so that no voltage is applied to the brushless motor 107 in the case when the input voltage supplied to the inverter circuit 106 becomes the predetermined value or less.

In addition, a motor control apparatus not using a position sensor is demanded from the viewpoint of making wireless and making the cost lower. In this situation, a method of estimating the rotor position of a brushless motor by detecting the motor current is proposed as a third conventional technology. In the third conventional technology, the rotor position of the motor is estimated by using a calculation equation for estimating the phase derived on the basis of a voltage equation from a motor current, a voltage applied to the brushless motor at the time when the motor current flows, and motor constants, such as the resistance, inductance, etc. of the brushless motor. An example of this third conventional technology is disclosed in a thesis "Control of a sensorless salient-pole brushless DC motor on the basis of estimation of speed electromotive force (Back EMF Estimation-Based Sensorless Salient-Pole Brushless DC Motor Drives)" by Takeshita, Ichikawa, Lee and Matsui, Thesis Journal, Vol. 117-D, No.1, pages 98 to 104, issued by the Institute of Electrical Engineers of Japan in 1997 (T.IEE Japan, Vol.117-D, No.1, '97).

As described above, in the first conventional technology, the rotor position of a brushless motor is detected by using a position sensor, and an inductor and a smoothing capacitor are used to convert the input voltage supplied to an inverter circuit into a DC voltage. Hence, since the inductor and the smoothing capacitor are large components having a large inductance and a large capacitance, respectively, it is difficult to make the motor control apparatus incorporating these components smaller.

In addition, the second conventional technology is a motor control apparatus in which the rotor position of a brushless motor is detected by using a position sensor, without using large components such as an inductor and a smoothing capacitor. This technology is thus effective from the viewpoint of making the apparatus smaller in size and lower in cost. However, since the input voltage supplied to the inverter circuit pulsates in the second conventional technology, this causes a problem of stopping voltage application to the brushless motor when the input voltage is a predetermined value or less.

A problem described below occurs in the case when a sensorless motor control apparatus is tried to be built so as to be made smaller in size and lower in cost by combining the second conventional technology configured not to use any inductor and smoothing capacitor with the third conventional technology configured to carry out sensorless motor drive. In the motor control apparatus having this kind of configuration, the rotor position cannot be estimated in periods during which voltage application to the brushless motor is stopped. Hence, sensorless drive for the brushless motor was impossible. In other words, in the case when the input voltage supplied to the inverter circuit pulsates, a sensorless motor control apparatus cannot be built by the simple combination of the second conventional technology and the third conventional technology.

GENERAL DESCRIPTION OF THE INVENTION

An object of the present invention is to provide a compact motor control apparatus having a compact rectifying circuit and capable of being configured with and without a position sensor. In addition, another object of the present invention is to provide a motor control apparatus capable of carrying out sensorless drive without stopping voltage application to a brushless motor even if the input voltage of the inverter circuit pulsates significantly.

In order to attain the above-mentioned objects, a motor control apparatus in accordance with the present invention is configured to comprise an inverter circuit which receives a fluctuating voltage, converts said voltage into a desired voltage and outputs said desired voltage to a brushless motor, and a control section which receives the input voltage to said inverter circuit, a motor current flowing to said brushless motor and a motor current command value indicating the value of a current required to flow to said inverter circuit, for controlling said inverter circuit by maintaining the phase of the voltage applied to said brushless motor when the value of the input voltage to said inverter circuit is smaller than the value of a voltage required to be applied to said brushless motor. The motor control apparatus in accordance with the present invention configured as described above can continuously apply a voltage to the brushless motor without stopping voltage application, even when the DC-side voltage of the inverter circuit is low.

In the motor control apparatus in accordance with the present invention, the control section thereof may be configured to estimate the rotation phase of the brushless motor on the basis of the current of the motor. With this configuration, even in the case when sensorless drive wherein the rotor phase information of the brushless motor is not obtained from a position sensor is carried out, the motor control apparatus can continuously carry out voltage application without stopping voltage application to the motor. Hence, the phase of the motor can be estimated, and the motor can be driven without using a position sensor.

In the motor control apparatus in accordance with the present invention, the control section thereof may be configured to stop integral control when the voltage value across said inverter circuit is smaller than the voltage command value to be applied to said brushless motor. With this configuration, errors unnecessary for a control apparatus for current control are not superimposed, whereby unnecessary motor current does not flow and the accuracy of sensorless estimation can be improved. It is thus possible to provide a motor control apparatus capable of stably carrying out excellent control.

In the motor control apparatus in accordance with the present invention, the control section thereof may be configured to calculate said voltage command value by using a calculation equation having a noninteracting term. In the motor control apparatus in accordance with the present invention, feedback control has a noninteracting term as described above. Hence, the independency of the current control system is enhanced, the accuracy of sensorless estimation is improved further, and more stable operation is attained.

In the motor control apparatus in accordance with the present invention, the control section thereof may be configured to detect the voltage of said inverter circuit, estimate a voltage to be applied to said inverter circuit at the next control cycle and control said inverter circuit. In the case when the input voltage of the inverter circuit pulsates significantly, an error occurs between the result of detection and the actual voltage, particularly when the control cycle of the inverter circuit is long. However, by using the detected voltage of the inverter circuit, the control section estimates a voltage to be applied to the inverter circuit at the next control cycle and carries out control, whereby the control section can accurately estimate the input voltage of the inverter circuit. As a result, more accurate voltage can be applied to the brushless motor. Hence, the present invention can provide a more excellent motor control apparatus.

The motor control apparatus in accordance with the present invention may be configured to incorporate a capacitor having a small capacitance on the input side of said inverter circuit. In the motor control apparatus in accordance with the present invention configured as described above, a regenerative current from the motor flows to a capacitor. Hence, it is possible to prevent abnormal rising of the input-side voltage of the main circuit of the inverter owing to the regenerative current. Hence, the apparatus has a function of protecting the circuit against overvoltage, thereby being high in safety.

The motor control apparatus in accordance with the present invention may be configured to incorporate an inductor having a small inductance on the input side of said inverter circuit. The motor control apparatus in accordance with the present invention configured as described above outputs a current having a smooth waveform, thereby being capable of eliminating harmonic components. Hence, the apparatus has a higher power utilization rate.

The motor control apparatus in accordance with the present invention may be configured to further comprises a boosting circuit having an inductor, diodes, switching devices and a capacitor, and a boosting circuit control section for controlling said boosting circuit, wherein said boosting circuit control section is configured to determine the duty value of said switching device on the basis of a signal from said control section. In the motor control apparatus in accordance with the present invention configured as described above, the boosting circuit can raise the input-side voltage of the inverter circuit. Hence, the maximum rotation speed of the brushless motor can be raised, and the brushless motor can operate in a wider rotation speed range.

The motor control apparatus in accordance with the present invention, wherein the boosting circuit control section, which is configured to receive the detected voltage phase and AC current of an AC power source, may be configured to comprises an AC current command section that outputs an AC current command value on the basis of said detected phase and a control signal from said control section, and a PWM command generation section that generates PWM command values for driving said switching devices on the basis of said AC current command value and said detected AC current of said AC power source and outputs said PWM command values. The motor control apparatus in accordance with the present invention configured as described above does not adversely affect the power source system.

The motor control apparatus in accordance with the present invention may be configured to further comprise a boosting circuit having an inductor to which a fluctuating voltage is input, a plurality of diodes forming a rectifying circuit, switching devices connected to said rectifying circuit and performing ON/OFF operation, and a capacitor outputting a boosted voltage, and a boosting circuit control section for controlling said boosting circuit. The motor control apparatus in accordance with the present invention configured as described above can significantly extend the operation range of a motor although the configuration of the apparatus is simple.

In the motor control apparatus in accordance with the present invention, $$C \leq 2 \times 10^{-7} \times P$$

is preferred to be established, assuming that the capacitance of said capacitor is C[F] and that the maximum output of said motor is P[W].

In the motor control apparatus in accordance with the present invention, incorporating an inductor having a small inductance on the input side of said inverter circuit, $$L \leq 9 \times 10^{-9}/C$$

is preferred to be established, assuming that the inductance of said inductor is L[H] and that the capacitance of said capacitor is C[F].

In the motor control apparatus in accordance with the present invention, $$L \leq P \times 10^{-6}$$

is preferred to be established, assuming that the inductance of said inductor is L[H] and that the maximum output power of said motor is P[W].

The motor control apparatus in accordance with the present invention configured as described above can be used for compressors, air conditioners, refrigerators, electric washing machines, electric dryers, blowers, electric vacuum cleaners and heat pump water heaters. The motor control apparatus can continuously apply a desired voltage to a drive source without stopping voltage application even when the DC-side voltage of the inverter circuit is low. Hence, the motor control apparatus can drive each of the above-mentioned appliances at high efficiency.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 4A is a graph showing a result of an experiment measured motor current, etc. under the control of the conventional motor control apparatus;

FIG. 23A is a block diagram showing a configuration of a motor control apparatus in accordance with Embodiment 11 of the present invention;

FIG. 25 is a block diagram showing the configuration of the compressor in accordance with Embodiment 12 of the present invention;

It will be recognized that some or all of the Figures are schematic representations for purposes of illustration and do not necessarily depict the actual relative sizes or locations of the elements shown.

DETAILED DESCRIPTION OF THE INVENTION

Motor control apparatuses in accordance with preferred embodiments of the present invention will be described below referring to the accompanying FIGS. 1 to 32.

<<Embodiment 1>>

Figure 1:
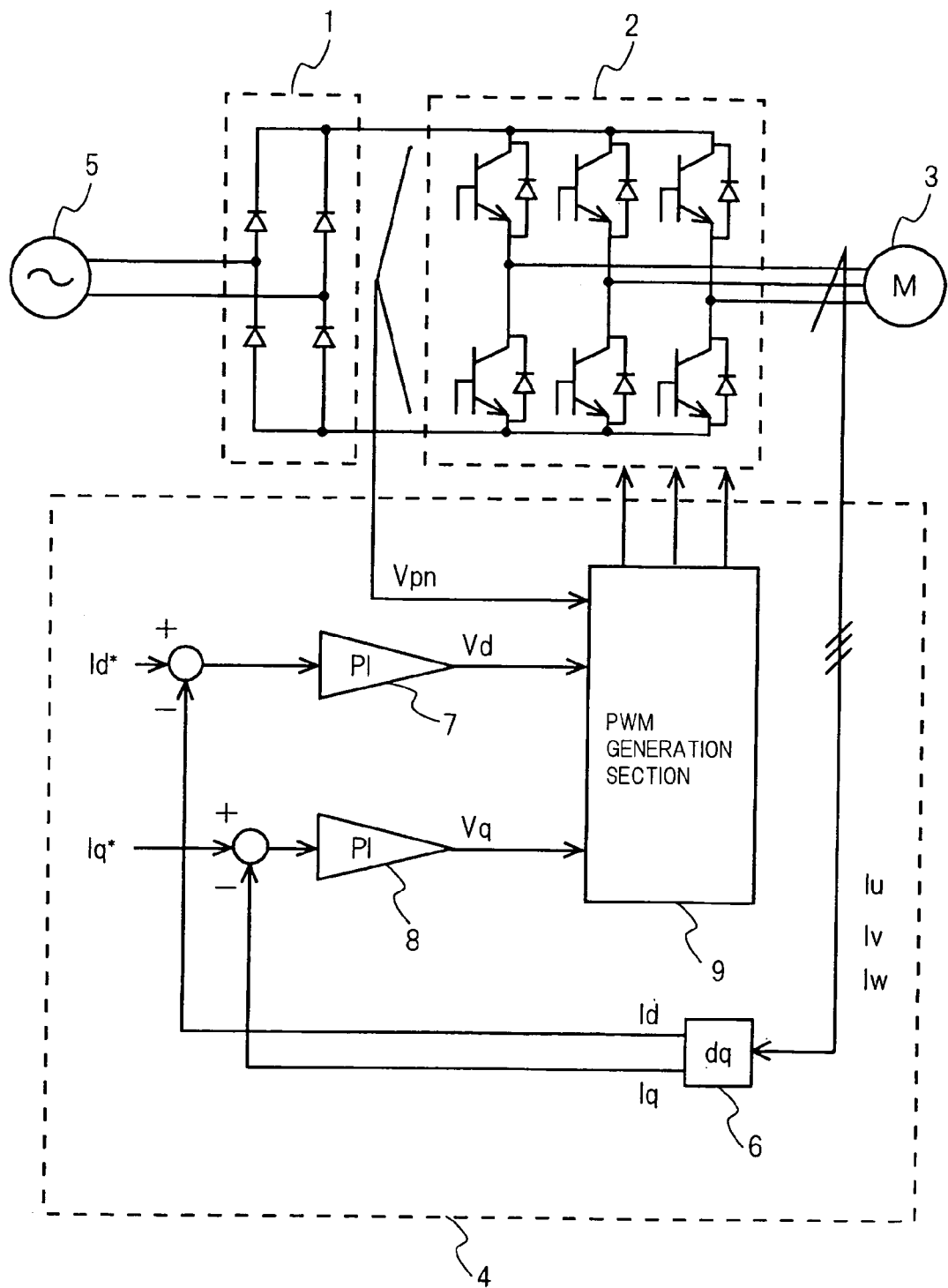
FIG. 1 is a block diagram showing a configuration of a motor control apparatus in accordance with Embodiment 1 of the present invention.

FIG. 1 is a block diagram showing the configuration of a motor control apparatus in accordance with Embodiment 1 of the present invention. In FIG. 1, the AC power output from a single-phase AC power source 5 is rectified to pulsating DC power by a rectifying circuit 1 and applied to an inverter circuit 2. The inverter circuit 2 converts the rectified DC power into an AC power and applies a desired voltage to a brushless motor 3. A control section 4 detects the current flowing to the brushless motor 3 and drives and controls the inverter circuit 2. The control section 4 comprises a dq conversion section 6, a d-axis PI controller 7, a q-axis PI controller 8, a PWM generation section 9, subtracting means, etc.

Next, the operation of the control section 4 in accordance with Embodiment 1 will be described.

The dq conversion section 6 calculates a d-axis current detection value Id and a q-axis current detection value Iq according to the following equation (1) by using the current detection values Iu, Iv and Iw flowing to the three-phase windings of the brushless motor 3. In the case that the brushless motor 3 has a position sensor, the position signal from the position sensor is used as a rotation phase θ for this calculation. In the case that the brushless motor 3 has no position sensor, an estimated phase obtained as a result of estimation of the rotor position is used as the rotation phase θ.

$$\begin{pmatrix} I_d \\ I_q \end{pmatrix} = \sqrt{\frac{2}{3}} \begin{pmatrix} \cos(\theta) & \cos\left(\theta - \frac{2}{3}\pi\right) & \cos\left(\theta + \frac{2}{3}\pi\right) \\ \sin(\theta) & \sin\left(\theta - \frac{2}{3}\pi\right) & \sin\left(\theta + \frac{2}{3}\pi\right) \end{pmatrix} \begin{pmatrix} I_u \\ I_v \\ I_w \end{pmatrix} \quad (1)$$

The error between a d-axis current command value Id* calculated on the basis of a rotation command, a torque command, etc. from the outside and a d-axis current detection value Id output from the dq conversion section 6 is input to the d-axis PI controller 7. The error is PI controlled by the d-axis PI controller 7 and a d-axis voltage command value Vd is generated. The error between a q-axis current command value Iq* calculated on the basis of a rotation command, a torque command, etc. from the outside and a q-axis current detection value Iq output from the dq conversion section 6 is input to the q-axis PI controller 8, just as in the case of the d-axis PI controller 7. The error is PI controlled by the q-axis PI controller 8 and a q-axis voltage command value Vq is generated.

The PWM generation section 9 generates a PWM signal for driving the inverter circuit 2 from the d-axis voltage command value Vd, the q-axis voltage command value Vq and an input voltage detection value Vpn obtained by detecting the voltage input to the inverter circuit 2, and outputs the PWM signal.

Figure 2:
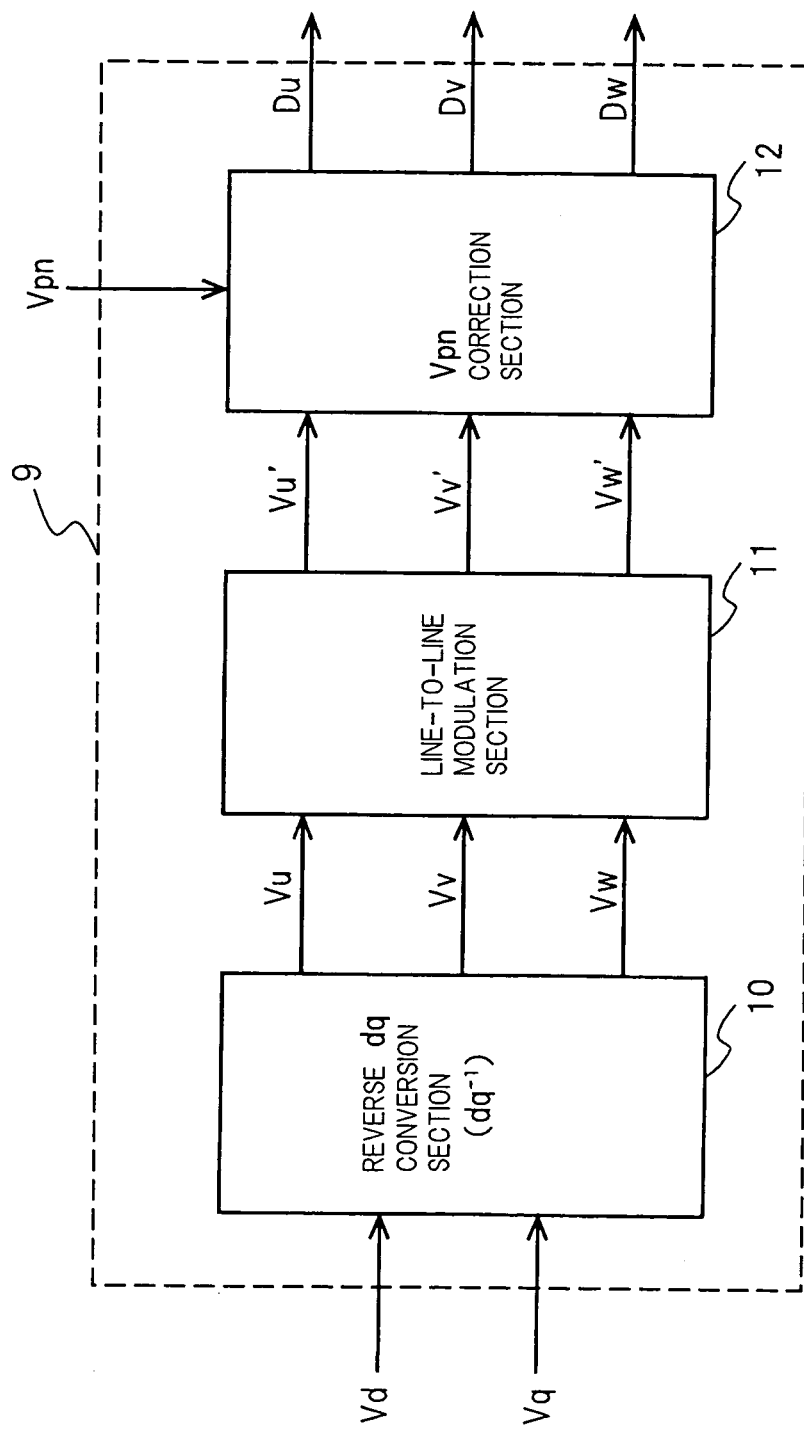
FIG. 2 is a block diagram showing a configuration of a PWM generation section in accordance with Embodiment 1 of the present invention.

FIG. 2 is a block diagram showing the configuration and operation of the PWM generation section 9. As shown in FIG. 2, the PWM generation section 9 has a reverse dq conversion section 10, a line-to-line modulation section 11 and a Vpn correction section 12.

The reverse dq conversion section 10 calculates three-phase sinusoidal voltage command values Vu, Vv and Vw from the d-axis voltage command value Vd and the q-axis voltage command value Vq according to the following equation (2). In the case when the brushless motor 3 has a position sensor, its position signal is used as a rotation phase θ for this calculation. In the case when the brushless motor 3 has no position sensor, an estimated phase obtained as a result of estimation of the rotor position is used as the rotation phase θ.

$$\begin{pmatrix} V_u \\ V_v \\ V_w \end{pmatrix} = \sqrt{\frac{2}{3}} \begin{pmatrix} \cos(\theta) & \sin(\theta) \\ \cos\left(\theta - \frac{2}{3}\pi\right) & \sin\left(\theta - \frac{2}{3}\pi\right) \\ \cos\left(\theta + \frac{2}{3}\pi\right) & \sin\left(\theta + \frac{2}{3}\pi\right) \end{pmatrix} \begin{pmatrix} V_d \\ V_q \end{pmatrix} \quad (2)$$

The line-to-line modulation section 11 detects the minimum value from the input three-phase sinusoidal voltage command values Vu, Vv and Vw and outputs the results obtained by subtracting the detected minimum value from the three-phase sinusoidal voltage command values as Vu', Vv' and Vw'. Hence, at least one-phase sinusoidal command value becomes zero, and the remaining two-phase sinusoidal command values become positive values.

The Vpn correction section 12 receives the outputs Vu', Vv' and Vw' from the line-to-line modulation section 11 and also receives the input voltage detection value Vpn, and generates PWM output duty values Du, Dv and Dw. The PWM output duty values Du, Dv and Dw are obtained according to the equation (3) or 4) described after.

Figure 3:
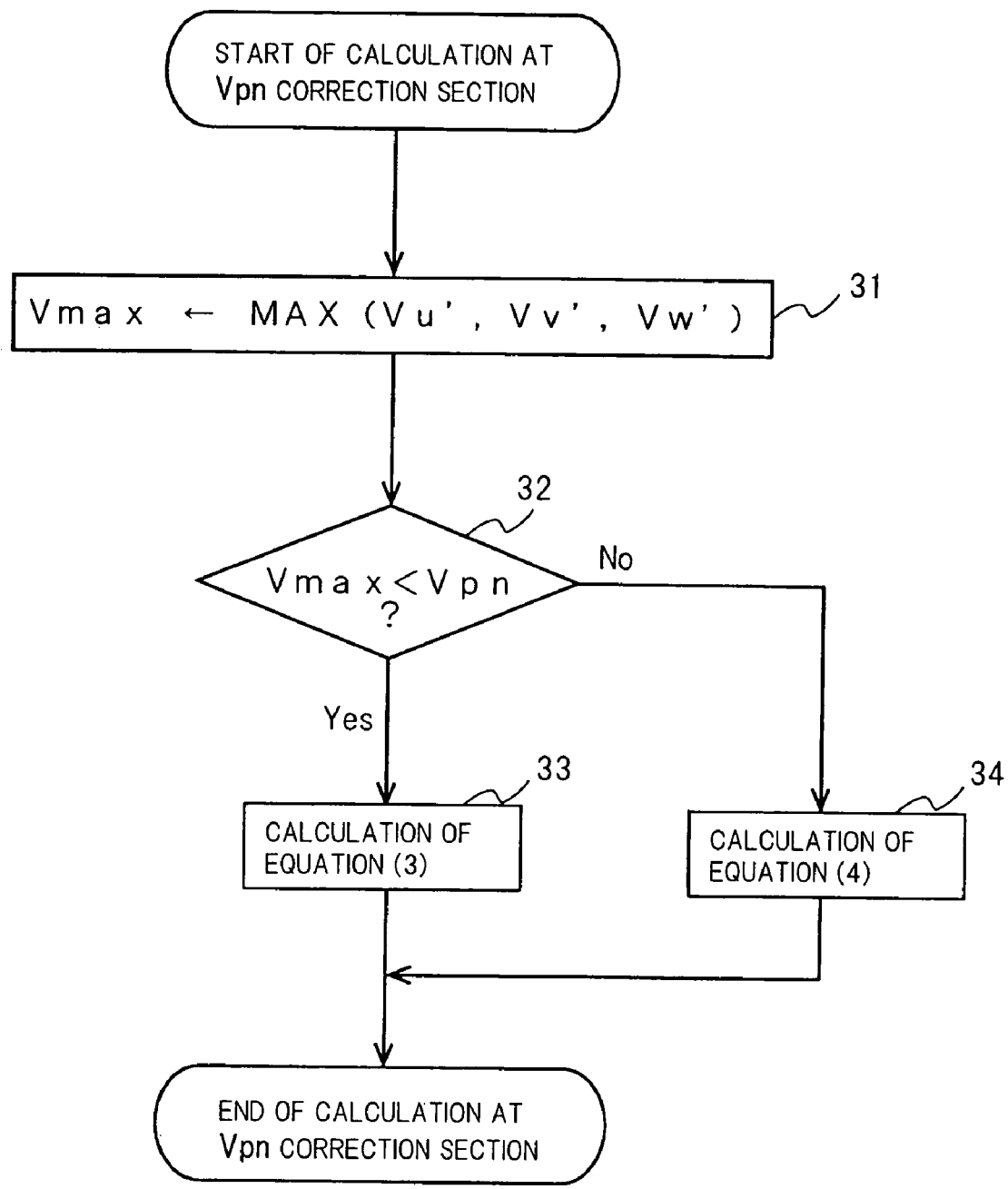
FIG. 3 is a flowchart showing an operation of a Vpn correction section in accordance with Embodiment 1 of the present invention.

FIG. 3 is a flowchart showing a calculation method carried out by the Vpn correction section 12.

The maximum value of the three-phase output values Vu', Vv' and Vw' supplied from the line-to-line modulation section 11 is detected, and the value is set as the application voltage maximum value Vmax (at step 31). Next, the application voltage maximum value Vmax is compared with the input voltage detection value Vpn in magnitude (at step 32). In the case when the input voltage detection value Vpn is larger than the application voltage maximum value Vmax at step 32, an ordinary calculation is carried out and desired application voltage command values are applied to the brushless motor 3. Hence, the PWM output duty values of the U, V and W phases are determined according to the following equation (3) (at step 33).

$$D_u = \frac{V_u'}{V_{pn}}, D_v = \frac{V_v'}{V_{pn}}, D_w = \frac{V_w'}{V_{pn}} \quad (3)$$

On the other hand, in the case when the input voltage detection value Vpn is smaller than the application voltage maximum value Vmax, the desired application voltage command values cannot be applied to the brushless motor 3. The maximum voltage capable of being generated at the time is applied, while the phases of applied voltages are not changed. For this purpose, the PWM output duty values of the U, V and W phases are determined according to the following equation (4) (at step 34).

$$D_u = \frac{V_u'}{V_{max}}, D_v = \frac{V_v'}{V_{max}}, D_w = \frac{V_w'}{V_{max}} \quad (4)$$

By the calculation according to the above-mentioned equation (4), the ratios of the U, V and W phases become the same as the ratios obtained before the calculation according to the equation (4), whereby voltages are applied to the brushless motor 3 while the phases of applied voltages are maintained.

Figure 4B:
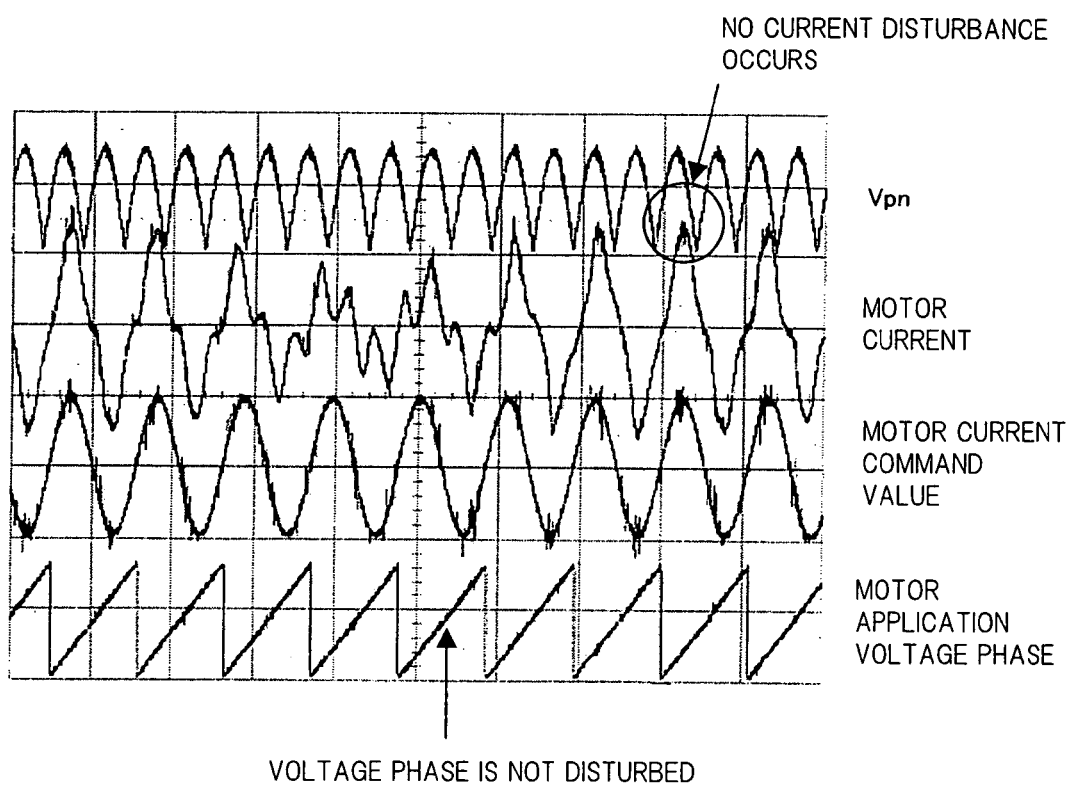
FIG. 4B is a graph showing a result of an experiment measured motor current, etc. under the control of the motor control apparatus in accordance with Embodiment 1.

FIG. 4A is a graph showing a result of an experiment with respect to motor current under the control of a conventional motor control apparatus. FIG. 4B is a graph showing a result of an experiment with respect to motor current in accordance with Embodiment 1 in the case when the equation (4) for the Vpn correction section 12 is used. In FIGS. 4A and 4B, the input voltage detection value Vpn, motor current, motor current command value and motor application voltage phase are shown in this sequence from above. In the experiment from which the result shown in FIG. 4A is obtained, a motor control apparatus having the configuration of the above-mentioned first conventional technology was used as the conventional motor control apparatus.

In the conventional motor control apparatus, when the input voltage detection value Vpn serving as the input voltage to the inverter circuit is small, a current significantly deviated from a target current flows in the brushless motor. This kind of current reduces motor efficiency and increases noise. In addition, if a large current flows, the magnets of the motor are demagnetized, whereby trouble may occur. Furthermore, the maximum value of the current becomes larger as the load applied to the brushless motor is larger. Hence, it is necessary to increase the rated current of the inverter circuit when the brushless motor is driven at a predetermined load. Therefore, it was necessary to use an inverter circuit comprising expensive components. Still further, in the conventional motor control apparatus, when the input voltage detection value Vpn obtained by detecting the voltage input to the inverter circuit 2 is small, the phase of the voltage applied to the motor is disturbed, and the motor current fluctuates significantly as shown in FIG. 4A.

On the other hand, in the case that the motor control apparatus in accordance with Embodiment 1 of the present invention is used, the phase of the voltage applied to the motor is maintained. Hence, the proper phase is applied to the brushless motor 3 even when the input voltage detection value Vpn is small. Furthermore, since the disturbance of the motor current at the time is small, motor efficiency is raised and noise is reduced.

According to the above-mentioned results of the experiments, since the motor current increases more than necessary in the conventional motor control apparatus, this results in making the inverter circuit larger in size and higher in cost. In the case of the motor control apparatus in accordance with Embodiment 1 of the present invention, the disturbance of the motor current is smaller, whereby the motor control apparatus can be configured by using an inverter circuit being small in current capacity and the like.

With the motor control apparatus in accordance with Embodiment 1 of the present invention, the rectifying circuit can be made smaller in size, and the apparatus can be configured with and without a position sensor. In addition, even if the input voltage of the inverter circuit pulsates significantly, the motor control apparatus in accordance with Embodiment 1 can carry out sensorless drive without stopping voltage application to the brushless motor.

<<Embodiment 2>>

Figure 5:
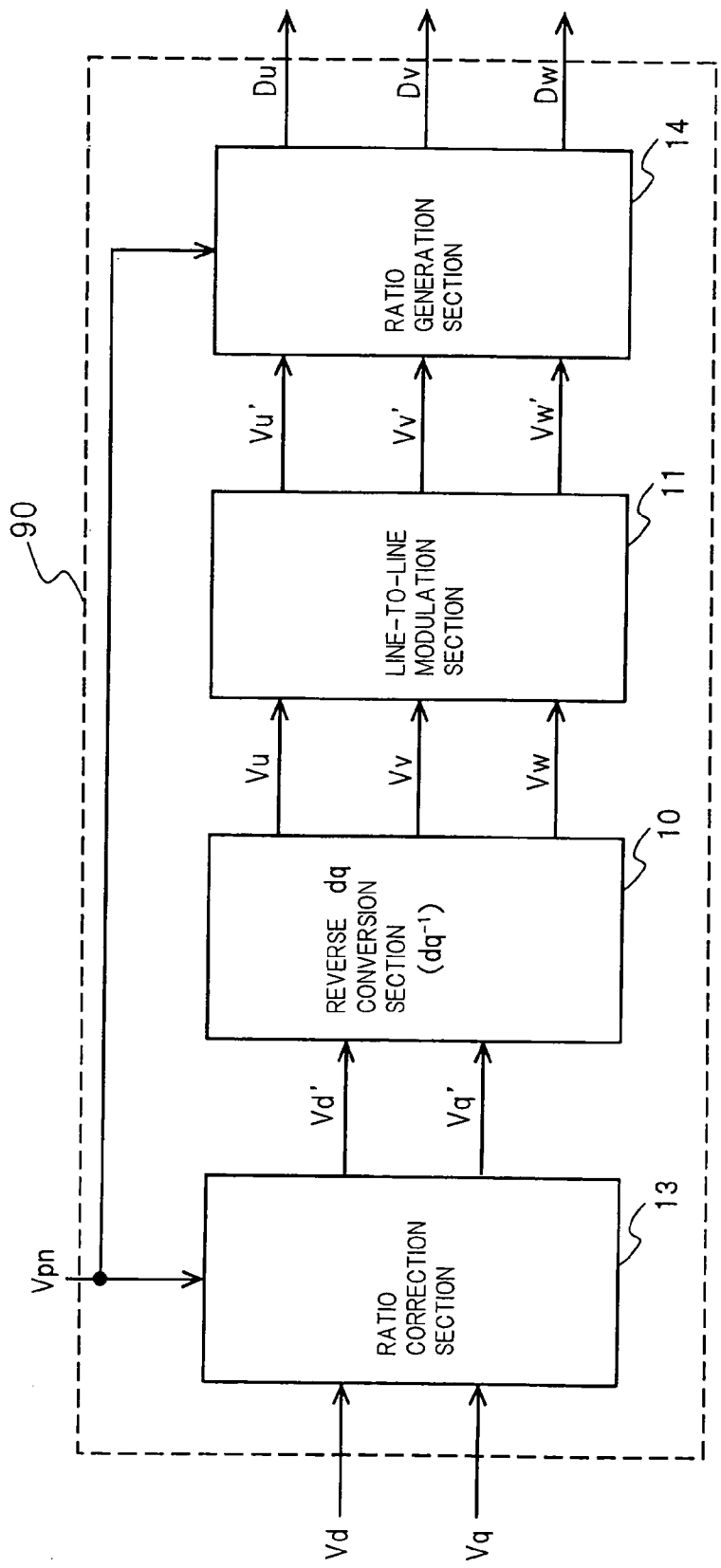
FIG. 5 is a block diagram of a PWM generation section of a motor control apparatus in accordance with Embodiment 2 of the present invention.

Next, a motor control apparatus in accordance with Embodiment 2 of the present invention will be described. FIG. 5 is a block diagram showing the operation of the PWM generation section 90 of the motor control apparatus in accordance with Embodiment 2. The configuration of the motor control apparatus in accordance with Embodiment 2 is substantially identical to the configuration in accordance with Embodiment 1, except the PWM generation section 9 of the motor control apparatus in accordance with Embodiment 1. Hence, the PWM generation section 90 will be described below.

As shown in FIG. 5, the PWM generation section 90 in accordance with Embodiment 2 has a ratio correction section 13, a reverse dq conversion section 10, a line-to-line modulation section 11 and a ratio generation section 14. In FIG. 5, the operations of the reverse dq conversion section 10 and the line-to-line modulation section 11 are similar to those in accordance with the above-mentioned Embodiment 1.

Figure 6:
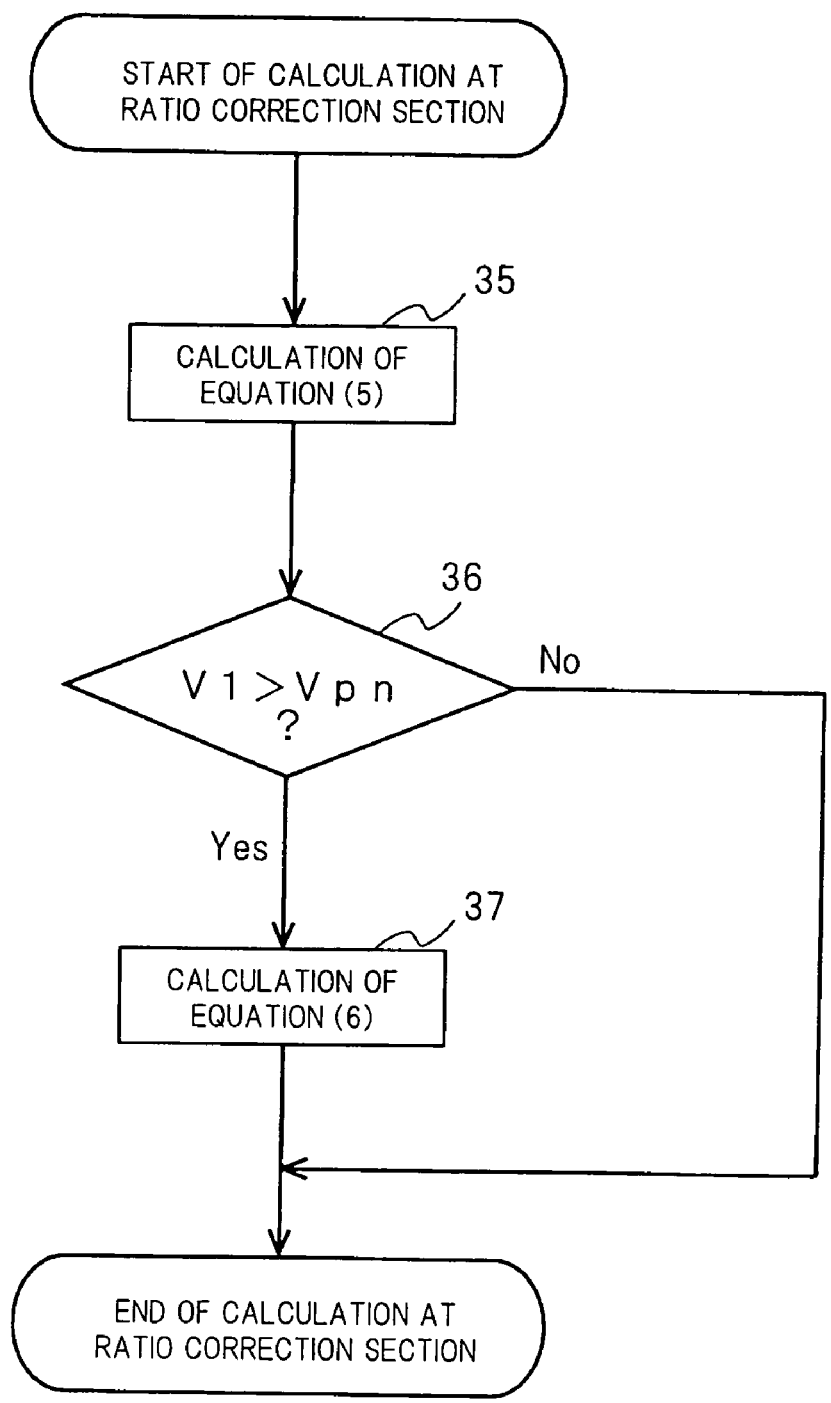
FIG. 6 is a flowchart showing an operation of a ratio correction section in accordance with Embodiment 2 of the present invention.

A calculation method carried out by the ratio correction section 13 is shown in the flowchart of FIG. 6. V1 is calculated from the d-axis voltage command value Vd and the q-axis voltage command value Vq according to the following calculation equation (5) (at step 35). V1 is com pared with the input voltage detection value Vpn in magnitude (at step 36).

$$V1 = \sqrt{2(Vd^2 + Vq^2)} \quad (5)$$

In the case when the input voltage detection value Vpn is smaller at step 36, the d-axis voltage command value Vd and the q-axis voltage command value Vq are changed to Vd' and Vq', respectively, according to the following equation (6) and then output (at step 37). In the case when the input voltage detection value Vpn is larger, the d-axis voltage command value Vd and the q-axis voltage command value Vq are output directly.

The ratio generation section 14 carries out the calculation according to the above-mentioned equation (3) and generates PWM output duty values Du, Dv and Dw.

$$V_{d'} = \frac{V_{pn}}{V_1} V_d, \ V_{q'} = \frac{V_{pn}}{V_1} V_q \quad (6)$$

When the d-axis voltage command value Vd and the q-axis voltage command value Vq are changed to Vd' and Vq', respectively, by the ratio correction section 13 according to the equation (6) as described above, the phase of the application voltage is maintained, although a desired application voltage is not applied to the brushless motor 3.

The PWM generation section 9 of the motor control apparatus in accordance with above-mentioned Embodiment 1 and the PWM generation section 90 of the motor control apparatus in accordance with Embodiment 2 are different from each other only in the method of calculation carried out in the middle. Hence, the PWM output duty values Du, Dv and Dw calculated by the PWM generation section 9 are the same as those calculated by the PWM generation section 90, provided that the conditions are the same.

The motor control apparatus in accordance with Embodiment 2 of the present invention can continuously carry out voltage application to the brushless motor 3 without stopping voltage application, even when the DC-side voltage of the inverter circuit is low. In addition, in Embodiment 2, even in the case when sensorless drive is carried out under a circumstance wherein the rotor phase information of the brushless motor 3 is not obtained from a position sensor, continuous voltage application can be carried out without stopping voltage application to the brushless motor 3. Hence, with the configuration of the motor control apparatus in accordance with Embodiment 2, the phase of the brushless motor 3 can be estimated at all times, whereby the present invention can provide a motor control apparatus capable of driving a motor without using a position sensor.

<<Embodiment 3>>

Figure 7:
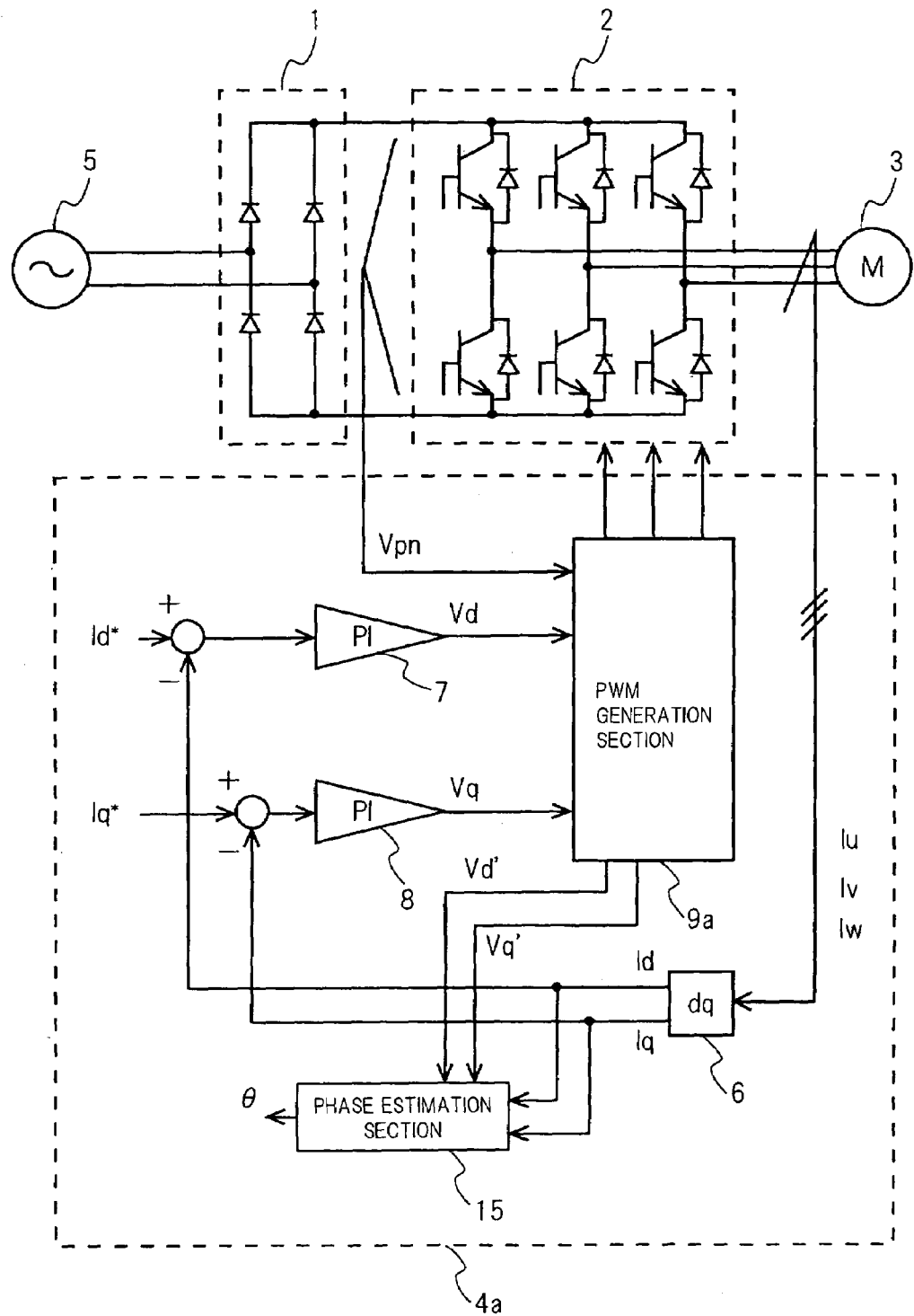
FIG. 7 is a block diagram showing a configuration of a motor control apparatus in accordance with Embodiment 3 of the present invention.

Next, a motor control apparatus in accordance with Embodiment 3 of the present invention will be described. FIG. 7 is a block diagram showing the configuration of the motor control apparatus in accordance with Embodiment 3. The functions and configurations of the rectifying circuit 1, the inverter circuit 2, the brushless motor 3 and the single-phase AC power source 5 shown in FIG. 7 are similar to those in accordance with the aforementioned Embodiment 1. The control section 4a of the motor control apparatus in accordance with Embodiment 3 has a phase estimation section 15. The phase estimation section 15 outputs an estimated phase θ on the basis of the d-axis current detection value Id and the q-axis current detection value Iq calculated by the dq conversion section 6 and the d-axis voltage command value Vd' and the q-axis voltage command value Vq' output from a PWM generation section 9a. The method of calculating the estimated phase θ is detailed in the aforementioned thesis "Control of a sensorless salient-pole brushless DC motor on the basis of estimation of speed electromotive force" by Takeshita, Ichikawa, Lee and Matsui, Thesis Journal, Vol. 117-D, No.1, pages 98 to 104, issued by the Institute of Electrical Engineers of Japan in 1997 (T.IEE Japan, Vol.117-D, No.1, '97). Hence, the explanation of the method is omitted herein. The estimated phase θ obtained by the calculation is sent to the dq conversion section 6 and the PWM generation section 9a and then used.

The method of calculating the estimated phase θ described in the above-mentioned document "Control of a sensorless salient-pole brushless DC motor on the basis of estimation of speed electromotive force" will be explained herein briefly referring to FIG. 7. The phase estimation section 15 sets an estimated value of the rotor phase of the brushless motor 3 and sets the error between the estimated value and the actual rotor phase of the brushless motor 3. From a general brushless motor voltage equation, a voltage equation on the basis of the estimated value of the rotor phase is established by using the error being set as described above. An estimated rotation speed of the brushless motor is calculated according to the equation. Feedback control is carried out so that the result of the calculation is equal to the actual rotation speed of the brushless motor. By carrying out the feedback control continuously, the above-mentioned error can converge to zero, whereby the estimated phase θ is made coincident with the actual rotor phase. Motor constants, such as the resistance and inductance values of the windings of the brushless motor 3, are used when the above-mentioned voltage equation is established. In addition, the voltage applied to the brushless motor 3 and the current flowing at the time are also used for the above-mentioned voltage equation. The phase of the brushless motor 3 can be estimated by using the applied voltage, the current and the motor constants of the brushless motor 3 as described above. Hence, sensorless drive is made possible. An estimated rotation speed ω of the brushless motor 3 can also be calculated by differentiating the estimated phase θ.

In the motor control apparatus in accordance with Embodiment 3, the d-axis voltage command value Vd' and the q-axis voltage command value Vq' to be input to the phase estimation section 15 are made equal to the d-axis voltage command value Vd and the q-axis voltage command value Vq to be applied actually to the brushless motor 3 by the PWM generation section 9a, respectively. Hence, even in the case when the DC-side voltage of the inverter circuit 2 pulsates, phase estimation can be carried out properly, whereby sensorless drive is made possible. For example, in the case that the PWM generation section 9a in accordance with Embodiment 3 is configured on the basis of the above-mentioned Embodiment 2, the d-axis voltage command value Vd' and the q-axis voltage command value Vq' output from the ratio correction section 13 shown in FIG. 5 should only be output to the phase estimation section 15. On the other hand, in the case that the PWM generation section 9a is configured on the basis of the above-mentioned Embodiment 1, the three-phase sinusoidal voltages Vu, Vv and Vw should only be calculated again from the PWM output duty values Du, Dv and Dw and the input voltage detection value Vpn supplied from the Vpn correction section 12 shown in FIG. 2. Then, the d-axis voltage command value and the q-axis voltage command value obtained as the result of dq conversion should only be output to the phase estimation section 15.

Since the input voltage pulsates, the input voltage detection value Vpn applied when the duty values are determined is different from the input voltage applied when the inverter circuit 2 actually carries out PWM operation. Hence, without outputting the voltage command values Vd' and Vq' to the phase estimation section 15 at the time of commanding, the d-axis and q-axis voltage command values may be calculated again by using the input voltage detection value Vpn obtained when the inverter circuit 2 actually carries out PWM operation and then output to the phase estimation section 15. It is needless to say that the accuracy of phase estimation is enhanced by this recalculation.

Figure 8A:
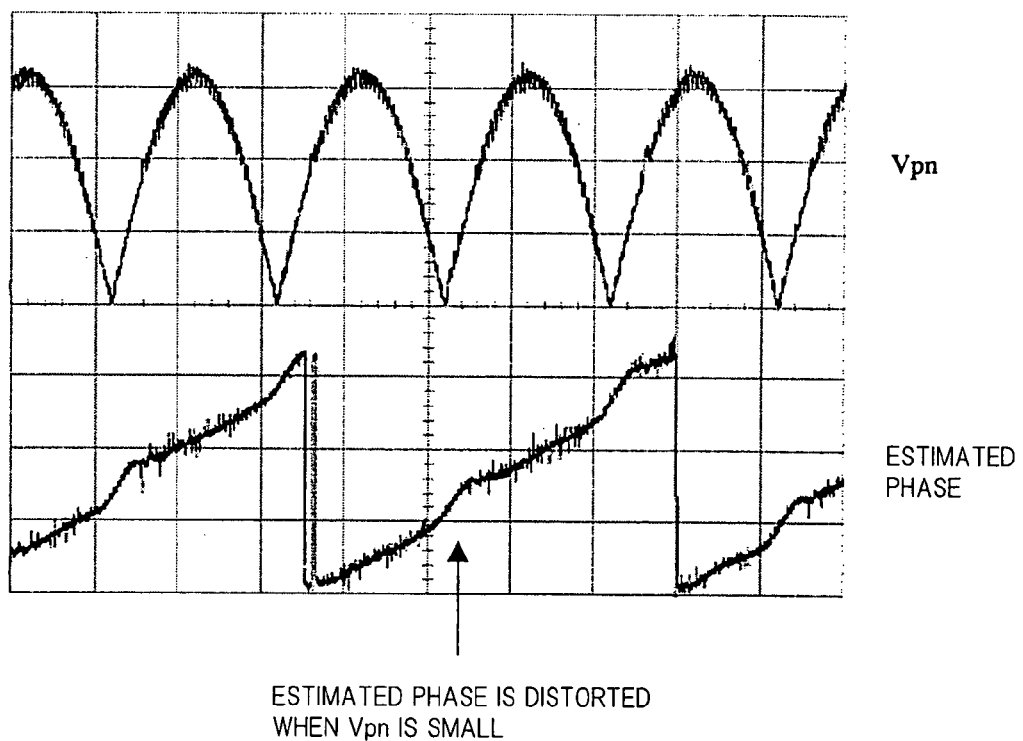
FIG. 8A is a graph showing a result of an experiment measured motor current, etc. by the conventional motor control apparatus.
Figure 8B:
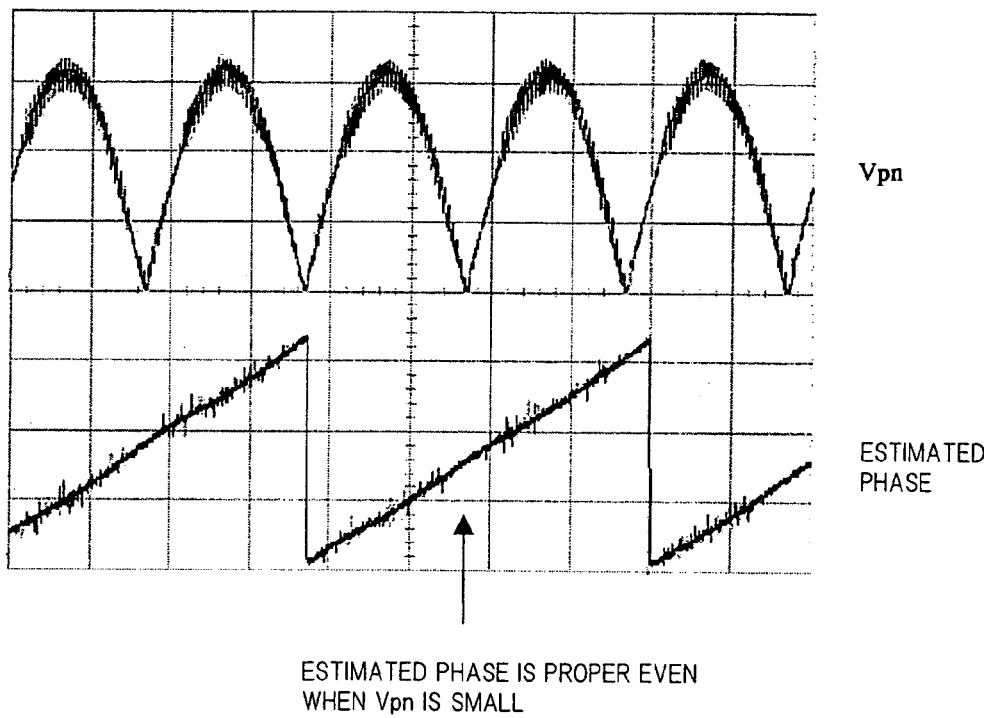
FIG. 8B is a graph showing a result of an experiment measured motor current, etc. by the motor control apparatus in accordance with Embodiment 3.

FIG. 8A is a graph showing the result of an experiment with respect to phase estimation by the conventional motor control apparatus. FIG. 8B is a graph showing the result of an experiment with respect to phase estimation by the motor control apparatus in accordance with Embodiment 3 of the present invention. In FIGS. 8A and 8B, the upper waveform shows the input voltage detection value Vpn, and the lower waveform shows the waveform of the estimated phase. In the experiment shown in FIG. 8A, a motor control apparatus configured by the simple combination of the above-mentioned second and third conventional technologies is used as the conventional motor control apparatus.

As shown in FIG. 8A, in the conventional motor control apparatus, the estimated phase is distorted when the input voltage detection value Vpn of the inverter circuit 2 is small, whereby the result of the estimation is deviated from the actual phase. This results in reducing motor efficiency and increasing noise. In addition, when the load of the motor is large, the deviation of the phase becomes larger. This causes a serious problem of losing synchronization and stopping the motor. As an apparatus for solving this kind of problem, the present invention can provide the motor control apparatus in accordance with Embodiment 3. As shown in FIG. 8B, the estimated phase in the motor control apparatus in accordance with Embodiment 3 becomes linear and identical to the actual phase. Hence, the motor control apparatus in accordance with Embodiment 3 can carry out excellent motor control without reducing motor efficiency and increasing noise, although the apparatus has a sensorless configuration.

<<Embodiment 4>>

Figure 9:
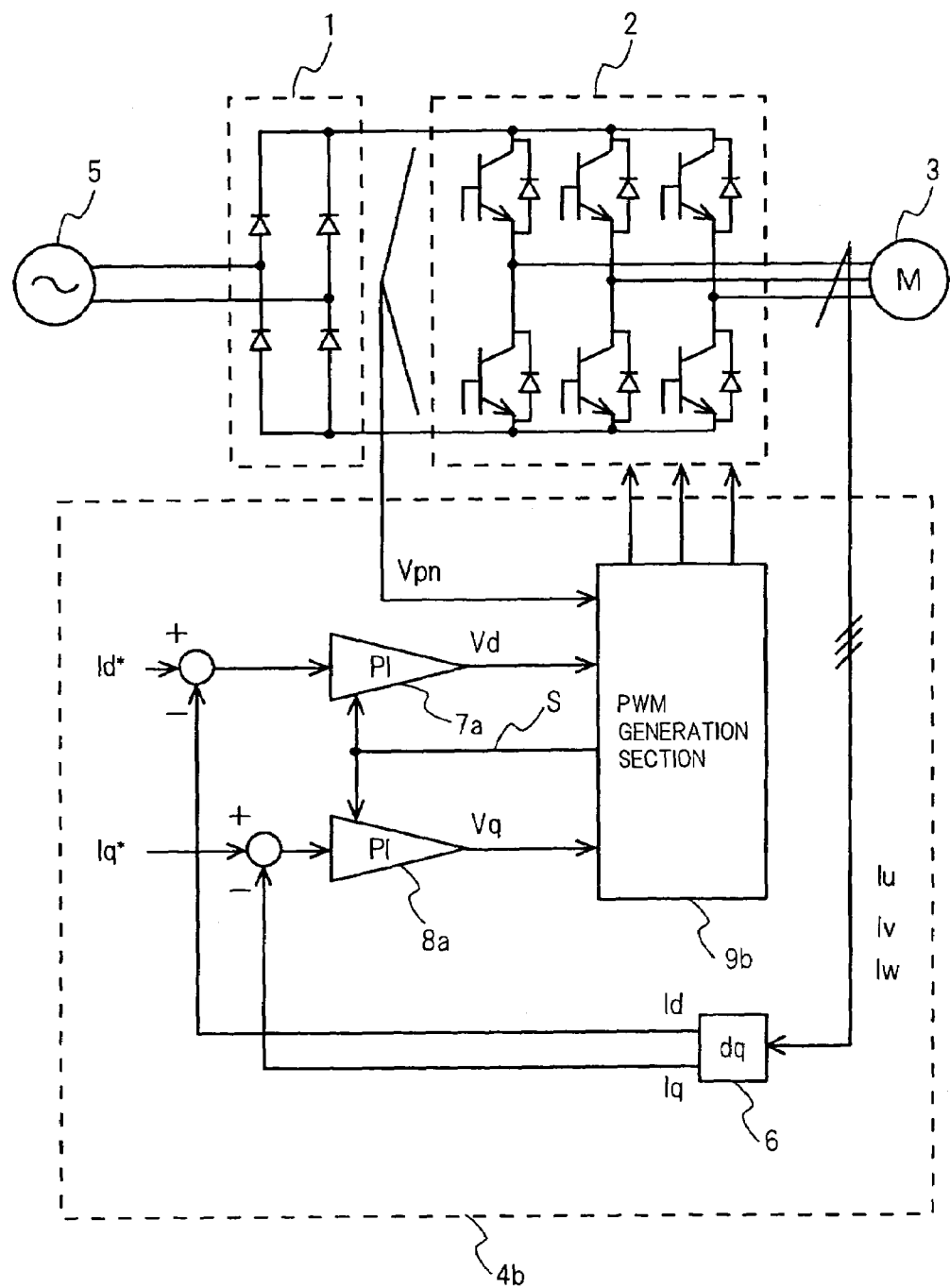
FIG. 9 is a block diagram showing a configuration of a motor control apparatus in accordance with Embodiment 4 of the present invention.

Next, a motor control apparatus in accordance with Embodiment 4 of the present invention will be described. FIG. 9 is a block diagram showing the configuration of the motor control apparatus in accordance with Embodiment 4. The functions and configurations of the rectifying circuit 1, the inverter circuit 2, the brushless motor 3 and the single-phase AC power source 5 shown in FIG. 9, are similar to those in accordance with the above-mentioned Embodiment 1. The control section 4b in accordance with Embodiment 4 has a d-axis PI controller 7a and a q-axis PI controller 8a, a PWM generation section 9b, a dq conversion section 6, subtracting means, etc.

The PWM generation section 9b in accordance with Embodiment 4 is configured to send a signal S to the d-axis PI controller 7a and the q-axis PI controller 8a when step 34 (the calculation of the equation (4)) is carried out depending on the result of the judgment at step 32 (FIG. 3) in the calculation process of the Vpn correction section (FIG. 2) in accordance with Embodiment 1.

When the PWM generation section 9b carries out step 34, that is, when the d-axis voltage command value Vd is generated from the error between the d-axis current command value Id* and the d-axis current detection value Id at step 34, the d-axis PI controller 7a, which has received the signal S from the PWM generation section 9b, carries out P (proportional) control but does not carry out I (integral) control. The q-axis PI controller 8a also carries out an operation similar to that of the above-mentioned d-axis PI controller 7a.

Figure 10:
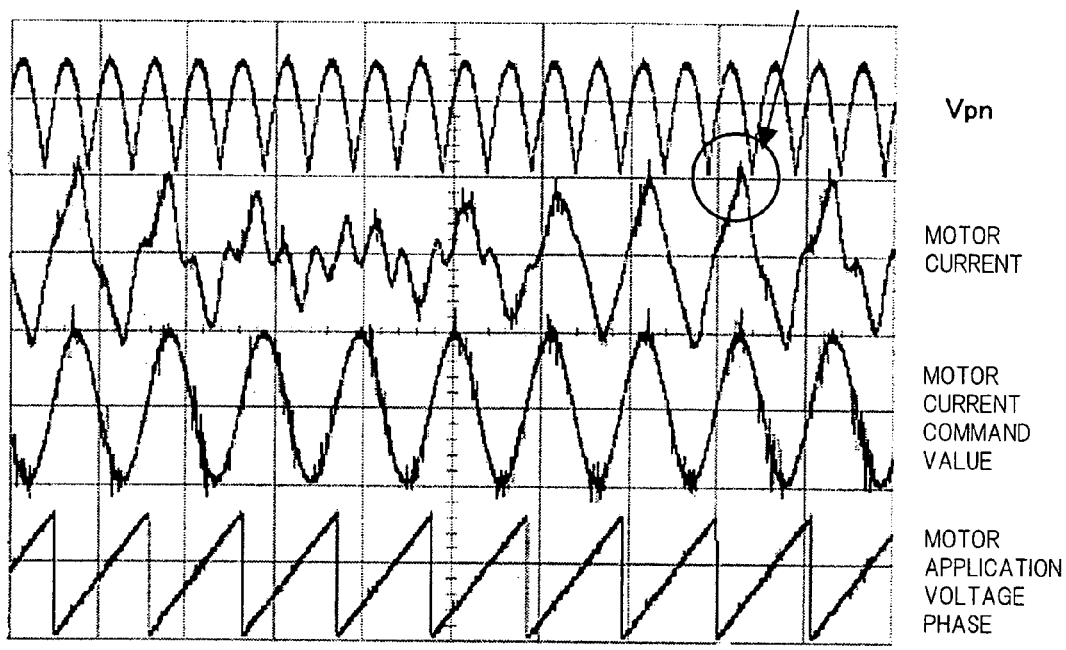
FIG. 10 is a graph showing a result of an experiment measured motor current, etc. by the motor control apparatus in accordance with Embodiment 4 of the present invention.

FIG. 10 is a graph showing a result of an experiment with respect to the motor current in accordance with Embodiment 4. In FIG. 10, the input voltage detection value Vpn, motor current, motor current command value and motor application voltage phase are shown in this sequence from above.

When the result of the experiment shown in FIG. 10 is compared with the result of the experiment shown in FIG. 4B in accordance with the aforementioned Embodiment 1, it is found that the frequency of occurrence wherein the motor current in particular becomes larger than the motor current command value has decreased significantly. It is thus found that the error has decreased. Furthermore, it is found that the circled portion of the motor current waveform shown in FIG. 10 is closer to the motor current command value than the circled portion of the motor current waveform shown in FIG. 4B. As described above, it has been confirmed by the experiments that the motor control apparatus in accordance with Embodiment 4 can improve the controllability of the motor current, reduce occurrence of eddy currents and raise the maximum value of the output torque of the motor.

<<Embodiment 5>>

Figure 11:
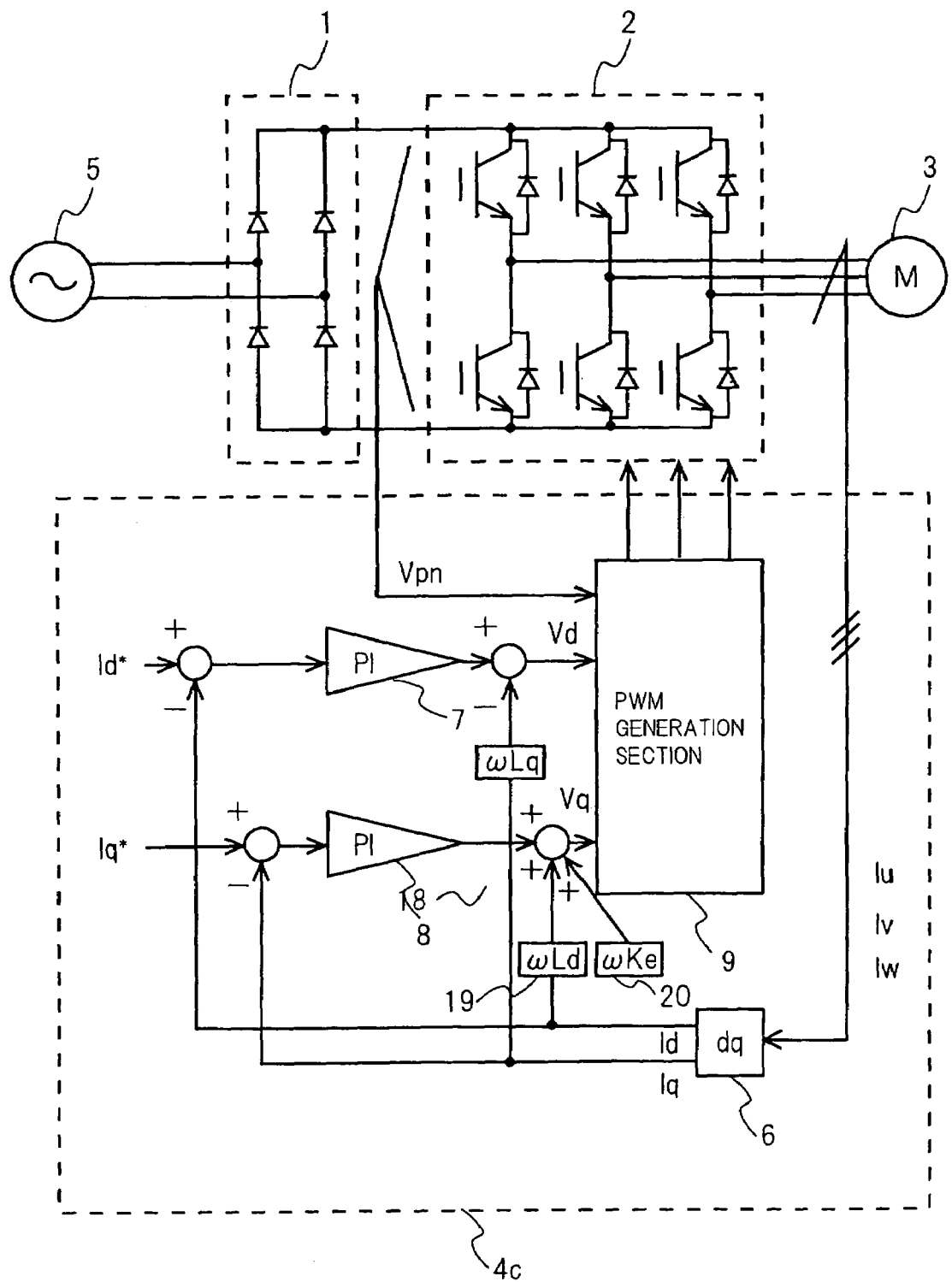
FIG. 11 is a block diagram showing a configuration of a motor control apparatus in accordance with Embodiment 5 of the present invention.

Next, a motor control apparatus in accordance with Embodiment 5 of the present invention will be described. FIG. 11 is a block diagram showing the configuration of the motor control apparatus in accordance with Embodiment 5. The functions and configurations of the rectifying circuit 1, the inverter circuit 2, the brushless motor 3 and the single-phase AC power source 5 shown in FIG. 11 are similar to those in accordance with the aforementioned Embodiment 1. The control section 4c in accordance with Embodiment 5 has a dq conversion section 6, a d-axis PI controller 7, a q-axis PI controller 8, a PWM generation section 9, a d-axis multiplier 18, a q-axis multiplier 19 and a q-axis adder 20. The functions of the dq conversion section 6, the d-axis PI controller 7, the q-axis PI controller 8 and the PWM generation section 9 are similar to those in accordance with Embodiment 1. The d-axis multiplier 18 outputs the result of the multiplication of the q-axis current detection value Iq, the rotation speed ω and the q-axis inductance Lq of the brushless motor 3. The result is output and then added to the output of the d-axis PI controller 7, and the result of the addition is set as the d-axis voltage command value Vd. The q-axis multiplier 19 outputs the result of the multiplication of the d-axis current detection value Id, the rotation speed ω and the d-axis inductance Ld of the brushless motor 3. The q-axis adder 20 outputs the result of the multiplication of the rotation speed ω and the induced voltage Ke of the q-axis brushless motor 3. The result of the addition of the respective outputs of the q-axis multiplier 19, the q-axis adder 20 and the q-axis PI controller 8 is set as the q-axis voltage command value Vq. These operations are represented by the following calculation equation (7).

$$\begin{pmatrix} V_d \\ V_q \end{pmatrix} = \underbrace{\begin{pmatrix} -\omega L_q I_q \\ \omega L_d I_d + \omega K_e \end{pmatrix}}_{\text{Noninteracting term}} + PI \begin{pmatrix} I_d^* - I_d \\ I_q^* - I_q \end{pmatrix} \quad (7)$$

In Embodiment 5, by adding a noninteracting term, that is, the first term on the right side of the equation (7), the independency of the d-axis and the q-axis can be enhanced.

Figure 12:
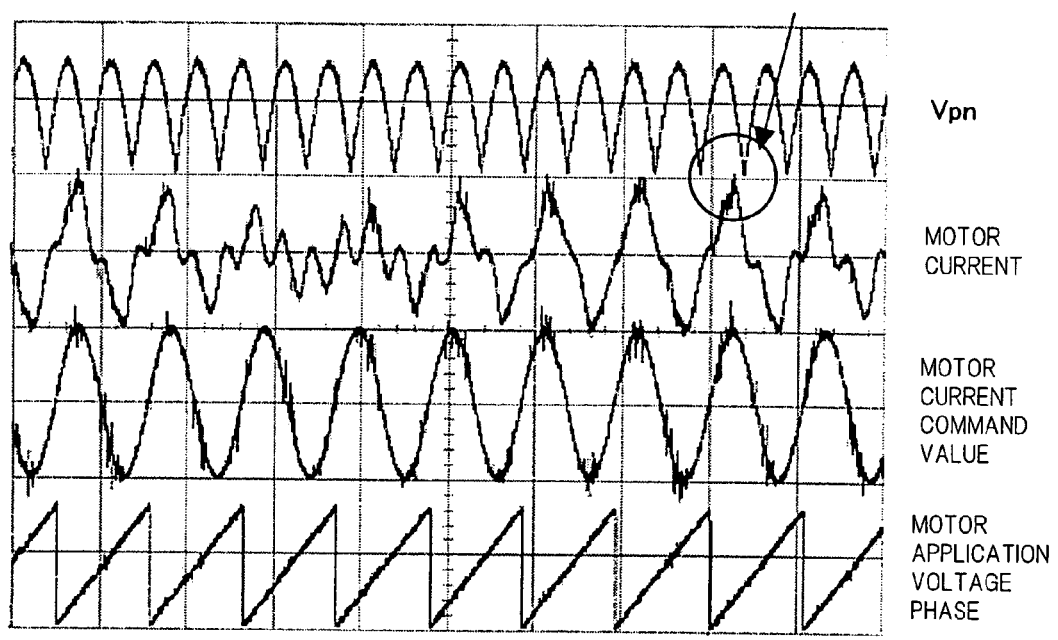
FIG. 12 is a graph showing a result of an experiment measured motor current, etc. by the motor control apparatus in accordance with Embodiment 5 of the present invention.

FIG. 12 is a graph showing a result of an experiment with respect to the motor current in accordance with Embodiment 5.

As shown in FIG. 12, the motor current follow-up performance of the motor control apparatus in accordance with Embodiment 5 is higher than that of the motor control apparatus in accordance with Embodiment 4 shown in FIG. 10. It is found that the circled portion of the motor current waveform shown in FIG. 12 is closer to the motor current command value than the circled portion shown in FIG. 10. It has been confirmed by the experiments that the motor control apparatus in accordance with Embodiment 5 can further reduce occurrence of eddy currents and raise the maximum value of the output torque of the motor in comparison with the motor control apparatus in accordance with Embodiment 4.

Figure 13:
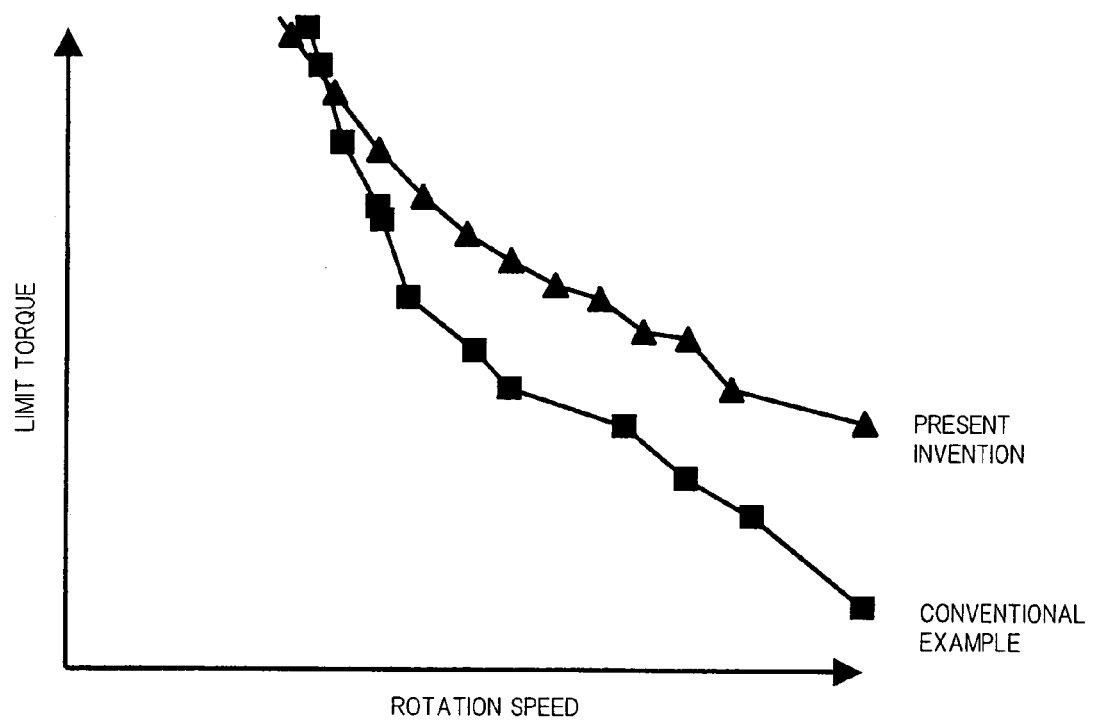
FIG. 13 is a graph showing a result of an experiment indicating the limit torque of a brushless motor by a motor control apparatus in accordance with the present invention and the conventional motor control apparatus.

FIG. 13 is graph showing the results of an experiment with respect to the relationship between the rotation speed and the limit torque of a brushless motor in the case when the motor control apparatus in accordance with the present invention is compared with the conventional motor control apparatus. The motor control apparatus in accordance with the present invention used for the experiment shown in FIG. 13 is an apparatus configured by the combination of the configurations of the aforementioned Embodiments 1, 3, 4 and 5. In addition, the conventional motor control apparatus used as the comparison example is a motor control apparatus configured by the simple combination of the aforementioned second and third conventional technologies. In this experiment, even when the configuration of the motor control apparatus in accordance with Embodiment 2 was used instead of the configuration of the motor control apparatus in accordance with Embodiment 1, a similar experiment result was obtained.

As shown clearly in FIG. 13, the limit torque in the case of the motor control apparatus in accordance with the present invention is significantly larger than that in the case of the conventional motor control apparatus. Hence, the torque requirements for the compressors of air conditioners, refrigerators, etc. can be satisfied sufficiently by using the motor control apparatus in accordance with the present invention. In addition, the specifications of the motor control apparatus for driving motors of electric washing machines, electric dryers, electric vacuum cleaners, blowers, etc. can be satisfied by using the motor control apparatus in accordance with the present invention.

<<Embodiment 6>>

Next, a motor control apparatus in accordance with Embodiment 6 of the present invention will be described. The motor control apparatus in accordance with Embodiment 6 is configured so that the input voltage detection value Vpn input to the inverter circuit is estimated from past data.

Since the input voltage detection value Vpn fluctuates significantly, the value is detected every control cycle in the motor control apparatus in accordance with Embodiment 6. It is herein assumed that the input voltage detection value detected at the last control cycle is Vpn[n–1] and that the input voltage detection value detected at the control cycle before last is Vpn[n–2]. Vpn[n–1] is not used as the input voltage detection value at the present control cycle. Instead, the variation between Vpn[n–1] and Vpn[n–2] is calculated, and the input voltage detection value Vpn[n] at the present control cycle is estimated. The equation for the calculation is represented by the following equation (8).

$$Vpn[n]=Vpn[n-1]+(Vpn[n-1]-Vpn[n-2]) \quad (8)$$

The equation (8) is established when it is assumed that the variation between the input voltage detection value Vpn[n–1] at the last control cycle and the input voltage detection value Vpn[n–2] at the control cycle before last is equal to the variation between the value at the present control cycle and the value at the last control cycle. By using the input voltage detection value Vpn[n] estimated by using the equation (8), the motor control apparatus in accordance with the present invention can output accurate duty values.

The configuration in accordance with Embodiment 6 for estimating the input voltage detection value Vpn[n] can be incorporated in the configurations in accordance with the aforementioned Embodiments 1 to 5. Hence, more accurate duty values can be output, and highly efficient motor control can be carried out.

<<Embodiment 7>>

Next, a motor control apparatus in accordance with Embodiment 7 of the present invention will be described. When a motor stops or the switching operation of an inverter circuit stops, the current flowing in the motor is regenerated to the input side of the inverter circuit. In the case when the regenerative current is large, the input-side voltage of the inverter circuit increases and becomes an overvoltage. This may damage the motor control apparatus incorporating the inverter circuit. The motor control apparatus in accordance with Embodiment 7 has a mechanism for preventing damage owing to the regenerative current.

Figure 14:
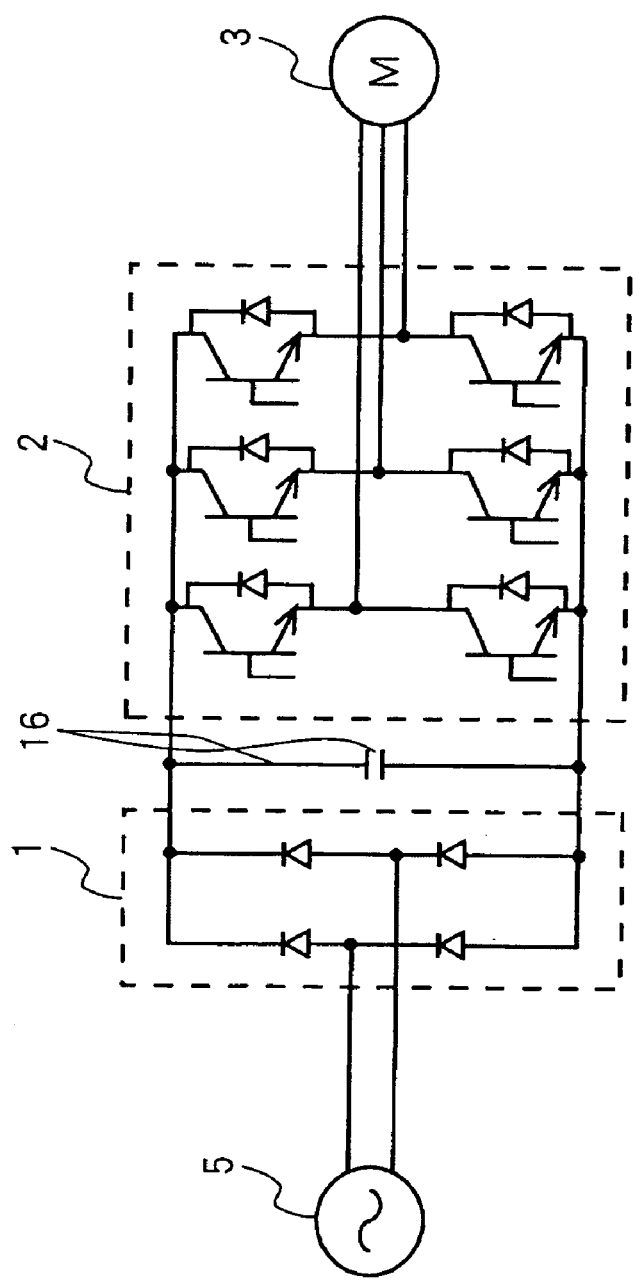
FIG. 14 is a block diagram showing a configuration of a motor control apparatus in accordance with Embodiment 7 of the present invention.

FIG. 14 is a circuit diagram showing a rectifying circuit 1, an inverter circuit 2, a brushless motor 3, a single-phase AC power source 5, etc., other than a control section, in the motor control apparatus in accordance with Embodiment 7 of the present invention. The control section is not shown. As shown in FIG. 14, a capacitor 16 having a small capacitance is provided between the rectifying circuit 1 and the inverter circuit 2. Damage to the motor control apparatus owing to a regenerative current can be prevented by providing the capacitor 16 between the rectifying circuit 1 and the inverter circuit 2 as described above. As a result, it is possible to attain a motor control apparatus having higher safety.

The capacitance of the capacitor 16 is set at a value at which the motor control apparatus is not damaged by the regenerative current. For example, in the case when the motor control apparatus is used for the compressor of an air conditioner or a heat-pump water-heater for household use, the capacitance should be about 0.1 to 50 $\mu F$. In the case of a refrigerator, an electric washing machine, an electric dryer and an electric vacuum cleaner, the capacitance should be about 0.1 to 20 $\mu F$ since the regenerative current is smaller than that of the air conditioner.

Although the configuration wherein the capacitor 16 is provided between the rectifying circuit 1 and the inverter circuit 2 is explained in the descriptions of Embodiment 7, the capacitor 16 should only be connected to the input side of the inverter circuit 2.

The regenerative current is a current that flows from the brushless motor 3 to the capacitor 16 when stored energy determined by the inductance L[H] of the windings of the brushless motor and the currents flowing through the windings is regenerated as a voltage to the capacitor 16 immediately before the stoppage of the brushless motor 3. The maximum output P[W] of the brushless motor 3 depends on the allowable current value and the inductance L of the brushless motor 3. In Embodiment 7, the maximum output P[W] of the brushless motor 3 has a relationship represented by the following equation (9). This relationship is based on comprehensive consideration of the relationship between the above-mentioned capacitance C[F] and the output of the brushless motor 3, a value at which the motor control apparatus is not damaged, and other factors.

$$C \leq 2 \times 10^{-7} \times P \quad (9)$$

The configuration in accordance with Embodiment 7 wherein damage to the motor control apparatus owing to the regenerative current is prevented can be incorporated in the configurations in accordance with the aforementioned Embodiments 1 to 6. Hence, it is possible to provide a motor control apparatus having higher reliability.

<<Embodiment 8>>

Figure 15:
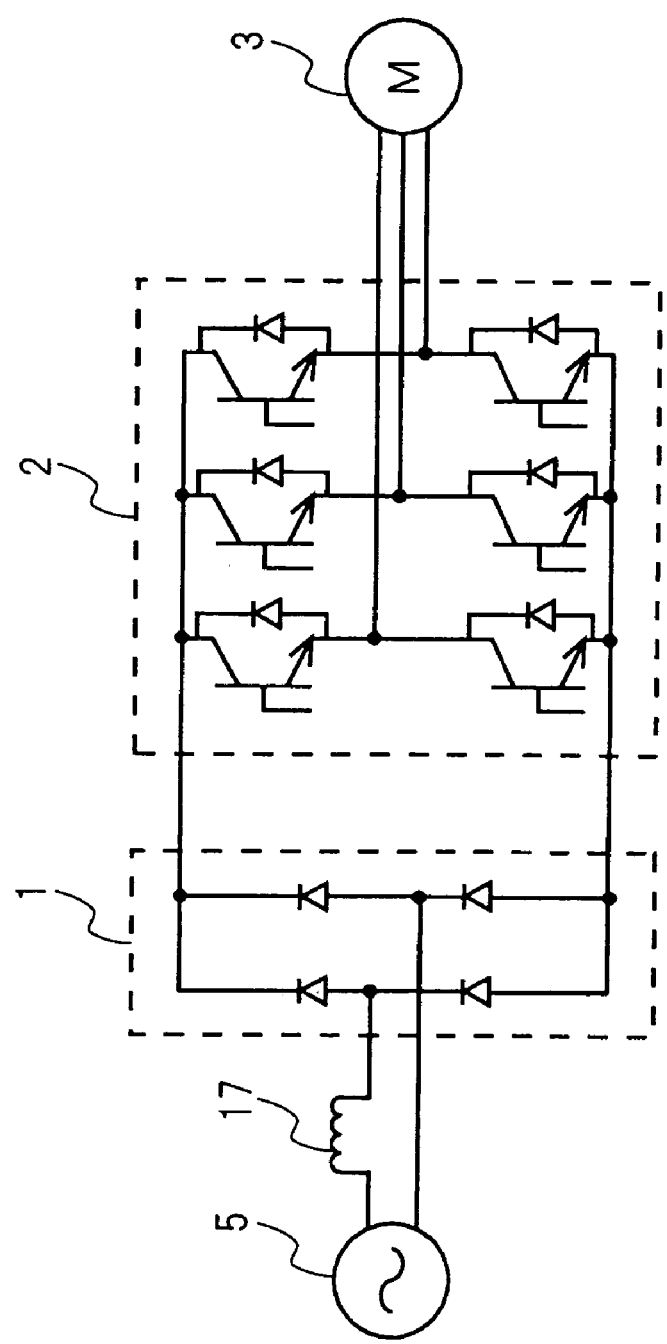
FIG. 15 is a block diagram showing a configuration of a motor control apparatus in accordance with Embodiment 8 of the present invention.

Next, a motor control apparatus in accordance with Embodiment 8 of the present invention will be described. FIG. 15 is a circuit diagram showing a rectifying circuit 1, an inverter circuit 2, a brushless motor 3, a single-phase AC power source 5, etc., other than a control section, in the motor control apparatus in accordance with Embodiment 8 of the present invention. The control section is not shown in FIG. 15.

The input current of the rectifying circuit 1 is affected by the switching operation of the inverter circuit 2. In particular, in the case that the carrier frequency of the switching operation is low, there is a problem of distorting the waveform of the input current. In the motor control apparatus in accordance with Embodiment 8, an inductor 17 having an inductance L is provided between the single-phase AC power source 5 and the rectifying circuit 1 as shown in FIG. 15. By providing the inductor 17 between the single-phase AC power source 5 and the rectifying circuit 1 of the motor control apparatus in accordance with Embodiment 8, the power factor of the input current can be raised and the waveform of the current can be improved. The inductance L of the inductor 17 is set at a value at which the distortion of the current decreases. For example, in the case when the motor control apparatus is used for the compressor of an air conditioner or a heat-pump water-heater for household use, the inductance L should be about 0.1 to 2.0 mH. In the case of a refrigerator, an electric washing machine, an electric dryer and an electric vacuum cleaner, the inductance L should be about 0.1 to 1.0 mH since the current is smaller than that of the air conditioner.

Although the configuration wherein the inductor 17 is provided between the single-phase AC power source 5 and the rectifying circuit 1 is explained in the descriptions of Embodiment 8, the inductor 17 should only be connected to the input side of the inverter circuit 2.

The inductance L of the inductor 17 relates to the magnitude of the input current and the switching frequency of the inverter circuit 2. In the case of the above-mentioned air conditioner, refrigerator, electric washing machine, etc., there is no great difference in the switching frequency. The switching frequency is substantially several kHz to several tens of kHz. Hence, it is considered that the proper inductance L in Embodiment 8 is almost determined by the magnitude of the input current. Since the voltage of the single-phase AC power source 5 is 200 to 230 V according to the worldwide universal standard, there is a correlation between the maximum output P[W] of the brushless motor 3 and the proper inductance L. This correlation is substantially represented by the following equation (10).

$$L \leq P \times 10^{-6} \quad (10)$$

In addition, in the case of a motor control apparatus provided with both the inductor 17 and the capacitor 16, a resonance phenomenon occurs. To prevent the resonance phenomenon from adversely affecting the AC power source system, the relationship represented by the following equation (11) is established between the inductance L of the inductor 17 and the capacitance C of the capacitor 16.

$$L \leq 9 \times 10^{-9}/C \quad (11)$$

A capacitor having a capacitance C may also be provided for a motor control apparatus provided with an inductor to prevent damage to the motor control apparatus owing to a regenerative current as explained in the descriptions of the aforementioned Embodiment 7. In this case, however, the inductor is connected in series with the capacitor, whereby a resonance phenomenon may occur. As known generally, the frequency of the resonance is ½ pv(LC), a value determined by the values of the inductor and capacitor. Hence, by setting the values of the inductor and capacitor so that the resonance frequency is higher than the frequencies speculated in power source harmonics regulations, for example, it is possible to provide a motor control apparatus generating less noise.

<<Embodiment 9>>

Figure 16A:
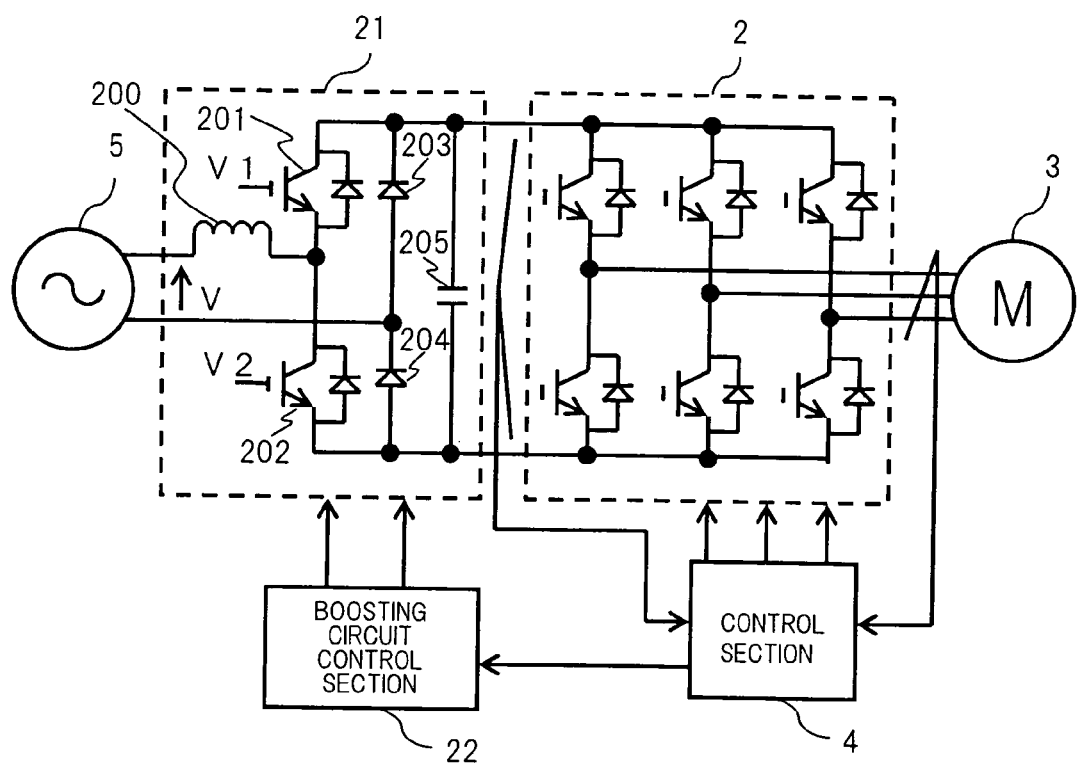
FIG. 16A is a block diagram showing a configuration of a motor control apparatus in accordance with Embodiment 9 of the present invention.

Next, a motor control apparatus in accordance with Embodiment 9 of the present invention will be described. FIG. 16A is a block diagram showing the configuration of the motor control apparatus in accordance with Embodiment 9 of the present invention. The functions and configurations of the inverter circuit 2, the brushless motor 3, the control section 4 and the single-phase AC power source 5 shown in FIG. 16A are similar to those in accordance with the afore-mentioned Embodiment 1. In the motor control apparatus in accordance with Embodiment 9, a boosting circuit 21 is provided on the input side of the inverter circuit 2. By boosting circuit 21, the AC voltage (100 V AC, for example) supplied from the single-phase AC power source 5 is boosted (to 200 V AC, for example) and input to the inverter circuit 2.

The boosting circuit 21 comprises an inductor 200 to which the input voltage V of the single-phase AC power source 5 is applied, two switching devices 201 and 202 connected in series, two diodes 203 and 204 connected in series and a capacitor 205. One terminal of the single-phase AC power source 5 is connected to the connection point of the two switching devices 201 and 202 via the inductor 200. The other terminal of the single-phase AC power source 5 is connected to the connection point of the two diodes 203 and 204. Furthermore, the series connection of the two switching devices 201 and 202, the series connection of the two diodes 203 and 204 and the capacitor 205 are connected in parallel with one another. The output across the capacitor 205 is input to the inverter circuit 2.

In addition, the motor control apparatus in accordance with Embodiment 9 is provided with a boosting circuit control section 22 for controlling the ON/OFF operation of the switching devices 201 and 202 of the boosting circuit 21. In the following descriptions, the switching device 201 disposed on the upper side of the motor control apparatus shown in FIG. 16A is referred to as an upper-arm switching device 201, and the switching device 202 disposed on the lower side is referred to as a lower-arm switching device 202.

Next, an example of the operation of the boosting circuit control section 22 of the motor control apparatus in accordance with Embodiment 9 will be described.

The boosting circuit control section 22 outputs PWM commands for controlling the upper-arm switching device 201 and the lower-arm switching device 202 provided in the boosting circuit 21. In the PWM command for one of the switching devices, an ON/OFF period in which the switching device repeats ON/OFF operation at intervals of a predetermined time and an OFF period in which the switching device maintains its OFF state are present alternately. In addition, in the ON/OFF period in which one of the switching devices repeats ON/OFF operation at intervals of the predetermined time, the other switching device is in the OFF period in which the OFF state of the switching device is maintained.

Figure 17:
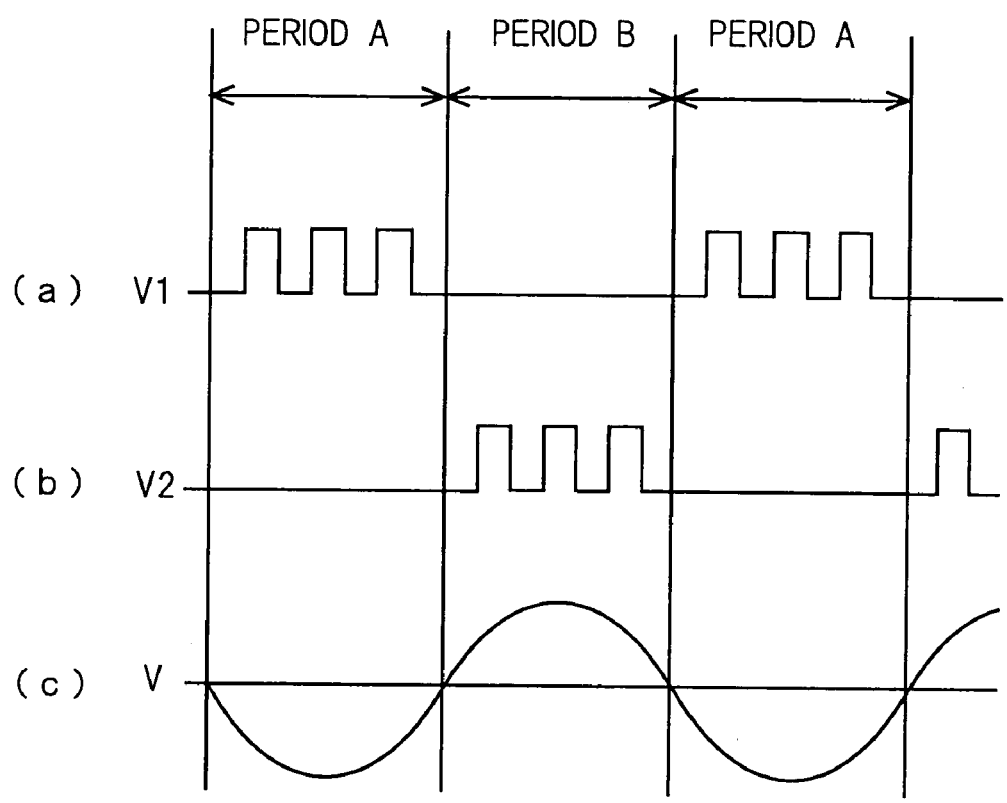
FIG. 17 is a waveform diagram showing an input waveform to a boosting circuit of the motor control apparatus in accordance with Embodiment 9 of the present invention.

In FIG. 17, the signal (a) is a control signal V1 output from the boosting circuit control section 22 to the upper-arm switching device 201. The signal (b) is a control signal V2 output from the boosting circuit control section 22 to the lower-arm switching device 202. The signal (c) is the output voltage V of the single-phase AC power source 5. The signals shown in FIG. 17 are examples of these signals. As shown in FIG. 17, for example, it is assumed that, in period A, the upper-arm switching device 201 carries out ON/OFF operation, and the lower-arm switching device 202 maintains the OFF state. It is also assumed that, in period B, the lower-arm switching device 202 carries out ON/OFF operation, and the upper-arm switching device 201 maintains the OFF state.

The state in period A is a state wherein the output voltage V at the terminal of the single-phase AC power source 5, not connected to the inductor 200, is higher. In addition, the state in period B is a state wherein the output voltage V at the terminal of the single-phase AC power source 5, connected to the inductor 200, is higher. In other words, period A and period B are generated in synchronization with the power source frequency of the single-phase AC power source 5. The boosting circuit control section 22 outputs the PWM commands to the boosting circuit 21 so that the upper-arm switching device 201 and the lower-arm switching device 202 provided in the boosting circuit 21 carry out the ON/OFF operation as described above.

Next, a method of determining the PWM output duty values of the PWM command in accordance with Embodiment 9 will be described.

The control section 4 makes a judgment as to whether step 34 shown in FIG. 3 and explained in the descriptions of the aforementioned Embodiment 3 has been carried out or not at every timing point in which the input voltage of the inverter circuit 2 becomes maximum. In other words, the control section 4 makes a judgment as to whether the PWM output duty values of the U, V and W phases have been determined according to the equation (4) or not in the case when the input voltage detection value Vpn is smaller than the application voltage maximum value Vmax.

In the case when it is judged that step 34 has been carried out, the control section 4 outputs a control signal indicating that step 34 has been carried out, to the boosting circuit control section 22. When the control signal is input from the control section 4, the boosting circuit control section 22 increases the PWM output duty values of the PWM command that is output to the boosting circuit 21. On the other hand, when the control signal is not input, the boosting circuit control section 22 decreases the PWM output duty values of the PWM command. As a result, the PWM output duty values of the PWM command of the boosting circuit control section 22 are changed at every timing point in which the input voltage of the inverter circuit 2 becomes the maximum value. This timing point is a timing point in which the output voltage of the single-phase AC power source 5 becomes the maximum value.

Next, a method of making a judgment as to whether the operation state is the state in period A or the state in period B will be described.

When the brushless motor 3 is started, the input voltage of the inverter circuit 2 becomes similar to that obtained when the capacitor 205 is not provided since the capacitance of the capacitor 205 provided in the boosting circuit 21 is small (just like the input voltage detection signal designated by Vpn in FIGS. 4A and 4B, for example). At this time, the lower-arm switching device 202 is subjected to ON/OFF operation according to the PWM output duty value of the predetermined PWM command, regardless of the control signal from the control section 4. In this case, when the output voltage at the terminal of the single-phase AC power source 5, connected to the inductor 200, is higher, the voltage of the capacitor 205 becomes higher than the voltage obtained when the ON/OFF operation is not carried out. Hence, it can be judged that the state at this time is a state wherein the voltage phase of the single-phase AC power source 5 is the phase in period B. On the other hand, when the output voltage at the terminal of the single-phase AC power source 5, not connected to the inductor 200, is higher, the voltage of the capacitor 205 is not boosted. Hence, it can be judged that the state at this time is a state wherein the voltage phase of the single-phase AC power source 5 is the phase in period A.

By making a detection as to whether the voltage of the capacitor 205 is boosted or not as described above, the voltage phase of the single-phase AC power source 5 can be detected. Therefore, in the motor control apparatus in accordance with Embodiment 9, a judgment as to whether the voltage phase is the phase in period A or the phase in period B can be carried out without using a voltage phase detection circuit.

Figure 18:
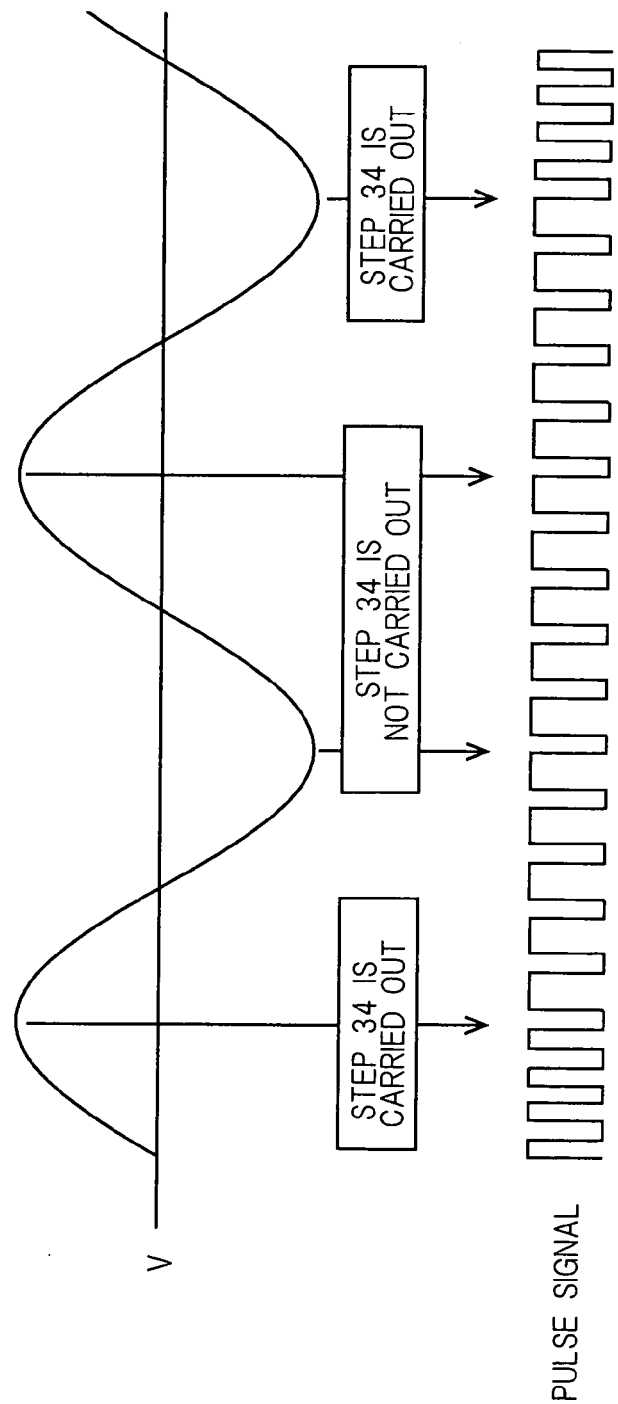
FIG. 18 is a waveform diagram showing an operation of the motor control apparatus in accordance with Embodiment 9 of the present invention.

FIG. 18 shows the waveform of the output voltage V of the single-phase AC power source 5 and the waveform of a pulse signal changed on the basis of a calculated PWM output duty value in the motor control apparatus in accordance with Embodiment 9.

In the above-mentioned Embodiment 9, the lower-arm switching device 202 is subjected to ON/OFF operation according to the PWM output duty value of the predetermined PWM command. However, the upper-arm switching device 201 may be subjected to ON/OFF operation at this time. In this case, it is needless to say that the voltage of the capacitor 205 is boosted in period A and that the voltage is not boosted in period B.

Figure 16B:
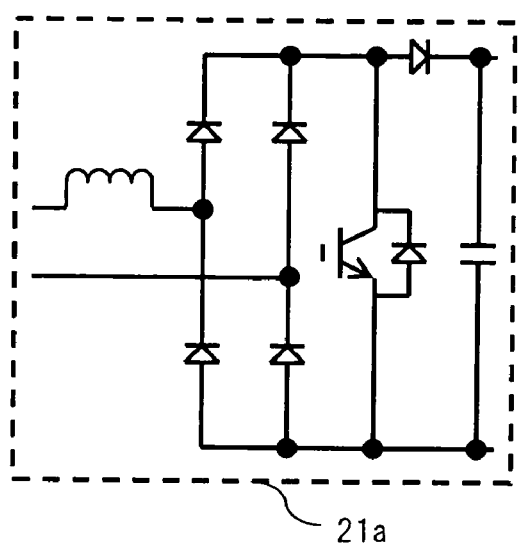
FIG. 16B is a circuit diagram showing another configuration of a boosting circuit of the motor control apparatus in accordance with Embodiment 9 of the present invention.

FIG. 16B is a circuit diagram showing the configuration of another boosting circuit 21a of the motor control apparatus in accordance with Embodiment 9. As shown in FIG. 16B, the boosting circuit 21a in accordance with Embodiment 9 may comprise a switching device, a plurality of diodes and a capacitor. In the case of this configuration, it is not necessary to distinguish between the upper-arm switching device and the lower-arm switching device. One switching device should only be subjected to switching operation on the basis of a PWM command.

In the motor control apparatus explained in the descriptions of Embodiment 9, in the case when the output voltage of the single-phase AC power source 5 is low to the extent that the voltage applied to the brushless motor 3 becomes insufficient, the input voltage of the inverter circuit 2 can be boosted. Hence, the motor control apparatus in accordance with Embodiment 9 can raise the maximum rotation speed of the brushless motor 3, whereby the operation range of the motor can be extended significantly. In particular, in the case of an air conditioner, since the maximum rotation speed of its motor can be raised, the performance variation range for cooling and heating can be extended, whereby comfort is enhanced further. In addition, in an appliance incorporating the motor control apparatus in accordance with Embodiment 9, the maximum performance during heating operation in particular is enhanced. It is thus possible to provide an air conditioner having a higher heating effect.

<<Embodiment 10>>

Figure 19:
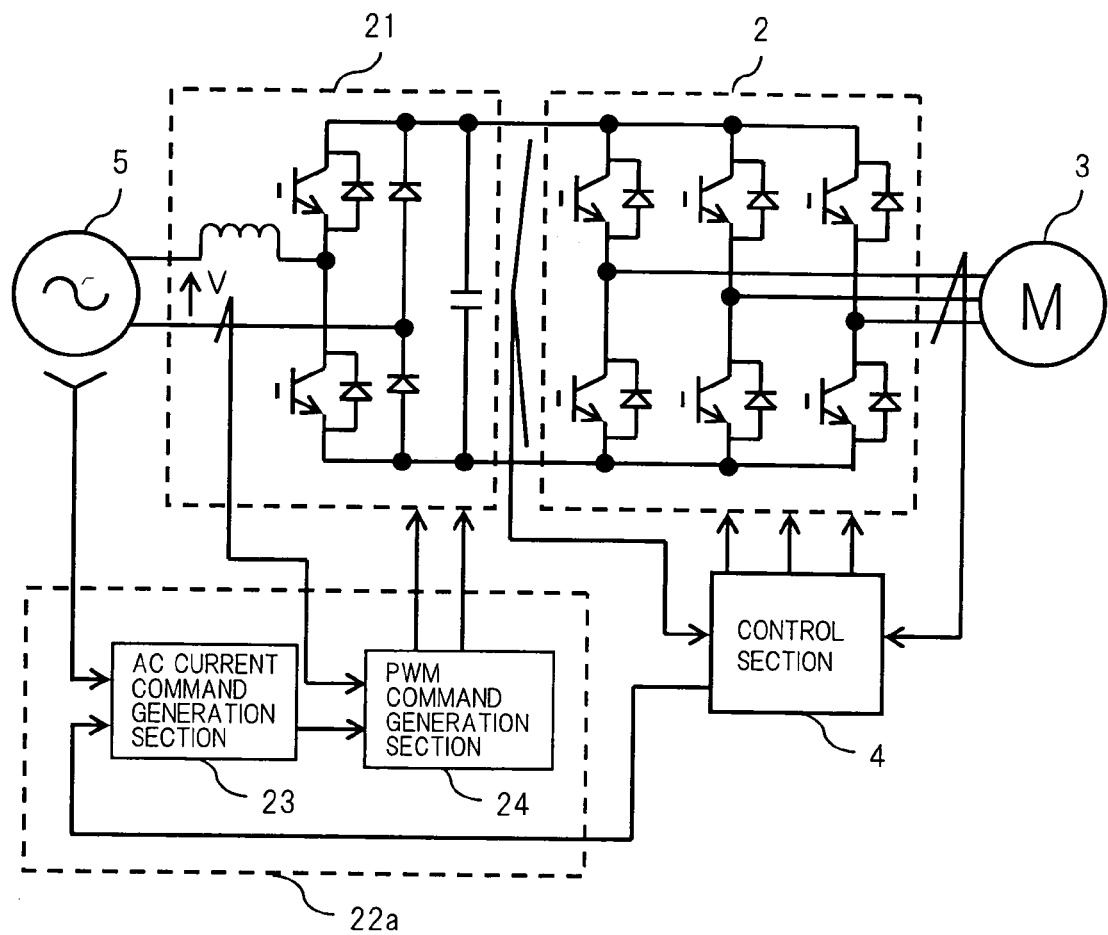
FIG. 19 is a block diagram showing a configuration of a motor control apparatus in accordance with Embodiment 10 of the present invention.

Next, a motor control apparatus in accordance with Embodiment 10 of the present invention will be described. FIG. 19 is a block diagram showing the configuration of the motor control apparatus in accordance with Embodiment 10 of the present invention. The functions and configurations of the inverter circuit 2, the brushless motor 3, the control section 4 and the single-phase AC power source 5 of the motor control apparatus in accordance with Embodiment 10 shown in FIG. 19 are similar to those in accordance with the aforementioned Embodiment 9.

In the motor control apparatus in accordance with Embodiment 10, a boosting circuit control section 22a comprises an AC current command generation section 23 and a PWM command generation section 24.

The AC current command generation section 23 of the boosting circuit control section 22a detects the voltage phase of the single-phase AC power source 5 and generates an AC current command value having the same phase as that of the detected voltage phase. Then, the generation section 23 outputs the command value to the PWM command generation section 24. The amplitude value of the AC current command value is generated on the basis of the control signal from the control section 4.

The control signal input from the control section 4 to the AC current command generation section 23 is the same control signal as that explained in the descriptions of the aforementioned Embodiment 9. When the control signal is input from the control section 4, the AC current command generation section 23 increases the amplitude value of the AC current command value. On the other hand, in the case when the control signal is not input from the control section 4, the AC current command generation section 23 decreases the amplitude value of the AC current command value.

Figure 20:
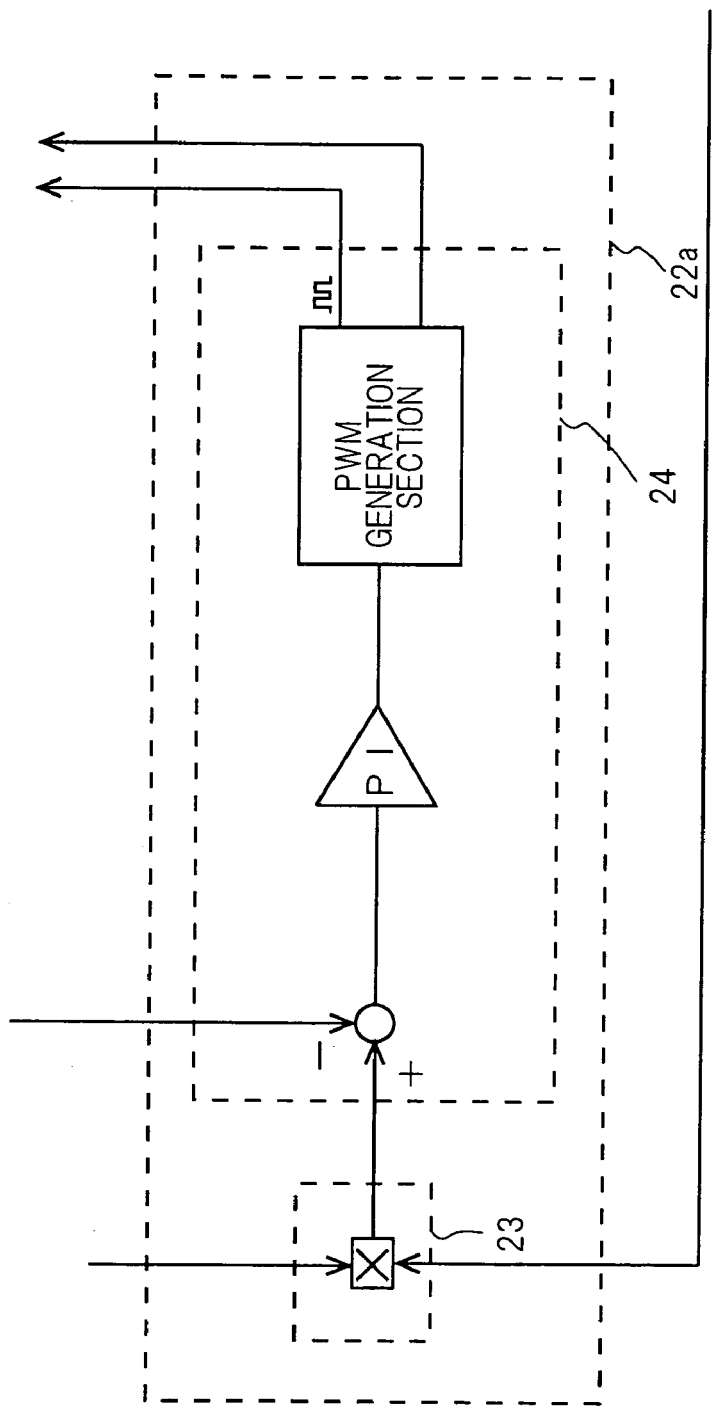
FIG. 20 is a block diagram showing a configuration of a boosting circuit control section of the motor control apparatus in accordance with Embodiment 10 of the present invention.

The AC current command value from the AC current command generation section 23 and the detected value of the AC current of the single-phase AC power source 5 are input to the PWM command generation section 24. The PWM command generation section 24 carries out error amplification so that the output current of the boosting circuit 21 becomes the AC current command value. The PWM command generation section 24 then generates PWM signals for driving the switching devices of the boosting circuit 21 and outputs the PWM signals to the boosting circuit 21. The PWM command generation section 24 in accordance with Embodiment 10 uses PI control as feedback control for error amplification. FIG. 20 is a circuit diagram showing a specific configuration of the boosting circuit control section 22a. However, the present invention is not limited to this kind of configuration for PI control. It is possible to use other feedback control having been used generally.

Figure 21:
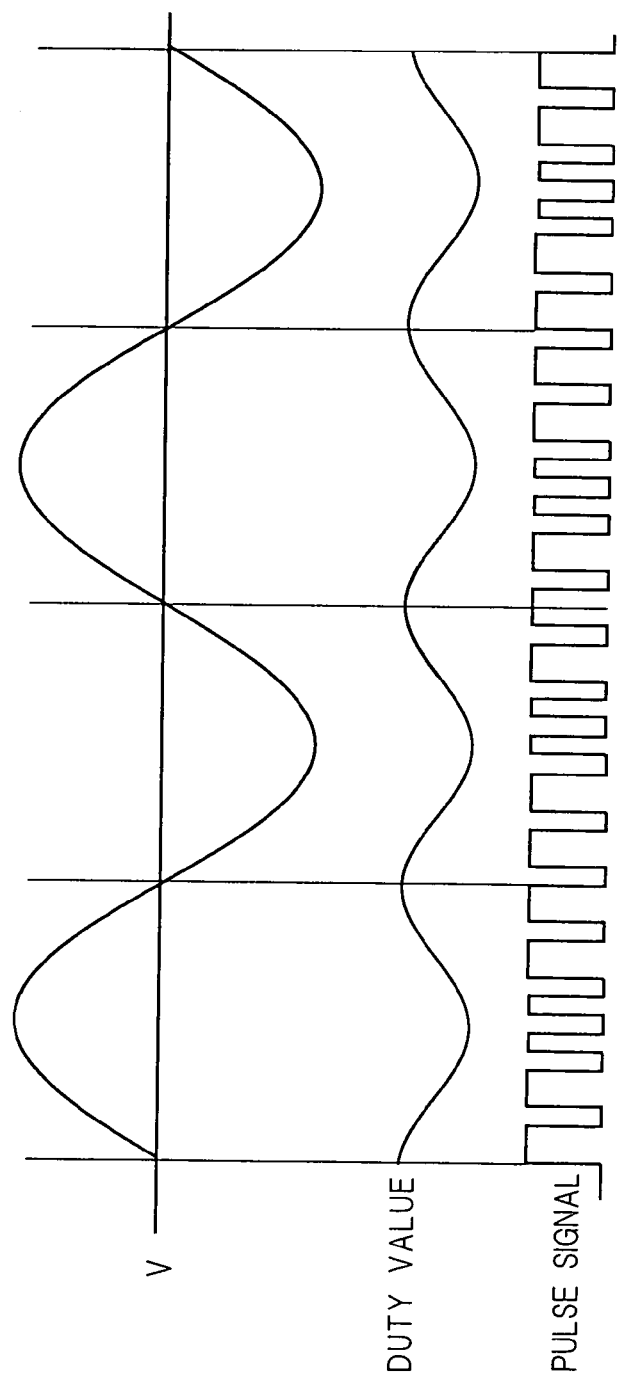
FIG. 21 is a waveform diagram showing an operation of the motor control apparatus in accordance with Embodiment 10 of the present invention.

FIG. 21 shows the waveform of the output voltage V of the single-phase AC power source 5, a calculated PWM output duty value and the waveform of a pulse signal changed on the basis of the PWM output duty value in the motor control apparatus in accordance with Embodiment 10.

Figure 22:
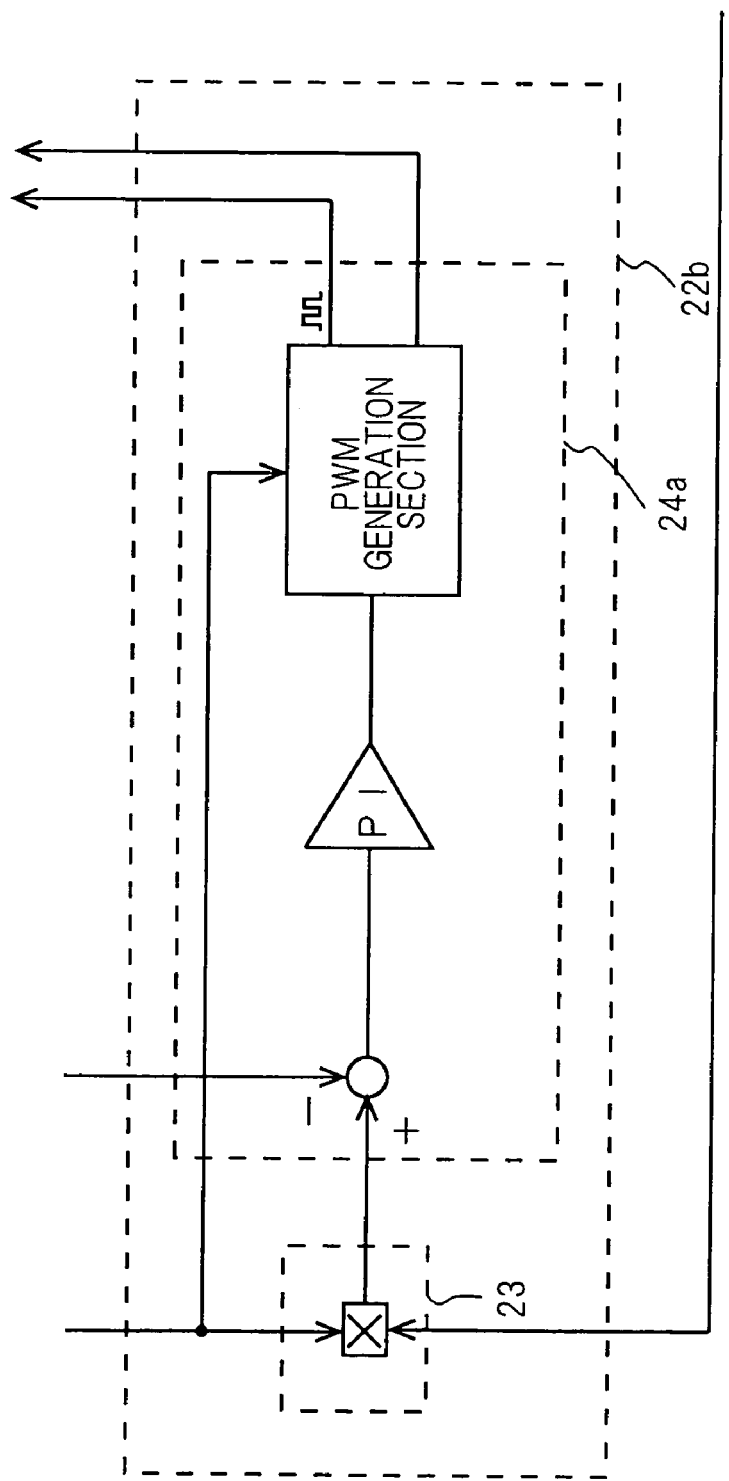
FIG. 22 is a block diagram showing another configuration of a boosting circuit control section of the motor control apparatus in accordance with Embodiment 10 of the present invention.

A judgment as to whether the upper-arm switching device or the lower-arm switching device of the boosting circuit 21 is driven and controlled is made depending on whether the AC current command value is positive or negative. For example, when the AC current command value is positive, PWM commands are output so that the lower-arm switching device is subjected to PWM operation and so that the upper-arm switching device is maintained at the OFF state. In addition, when the AC current command value is negative, PWM commands are output so that the upper-arm switching device is subjected to PWM operation and so that the lower-arm switching device is maintained at the OFF state. Or, since the voltage phase is detected by the boosting circuit control section 22a, the detected voltage phase may be input to the PWM command generation section 24 and then a judgment as to whether the upper-arm switching device or the lower-arm switching device is subjected to PWM operation may be made on the basis of the detected voltage phase. FIG. 22 is a circuit diagram showing a specific configuration of a boosting circuit control section 22b configured as described above.

The boosting circuit 21a comprising one switching device and shown in FIG. 16B in accordance with the above-mentioned Embodiment 9 may be used as the boosting circuit 21.

The waveform of the current flowing to the single-phase AC power source 5 becomes nearly sinusoidal by virtue of the above-mentioned operations of the boosting circuit 21 and the boosting circuit control sections 22a and 22b. Hence, the power factor of the power source becomes nearly one, whereby it is possible to provide a motor control apparatus not adversely affecting the power source system.

<<Embodiment 11>>

Next, a motor control apparatus in accordance with Embodiment 11 of the present invention will be described. FIG. 23A is a block diagram showing the configuration of the motor control apparatus in accordance with Embodiment 11 of the present invention. The functions and configurations of the inverter circuit 2, the brushless motor 3, the control section 4 and the single-phase AC power source 5 of the motor control apparatus in accordance with Embodiment 11 shown in FIG. 23A are similar to those in accordance with the aforementioned Embodiments 9 and 10.

The motor control apparatus in accordance with Embodiment 11 differs from the motor control apparatus in accordance with Embodiment 10 in that a double-voltage rectifying boosting circuit 25 is provided instead of the boosting circuit 21. This double-voltage rectifying boosting circuit 25 comprises an inductor 300, a switching device 301, diodes 302, 303, 304 and 305, a capacitor 306 having a large capacitance and a capacitor 307 having a small capacitance. A boosting circuit control sections 22c comprises an AC current command generation section 23 and a PWM command generation section 24b. The operation of the AC current command generation section 23 is substantially the same as that explained in the descriptions of the aforementioned Embodiments 9 and 10.

Figure 24:
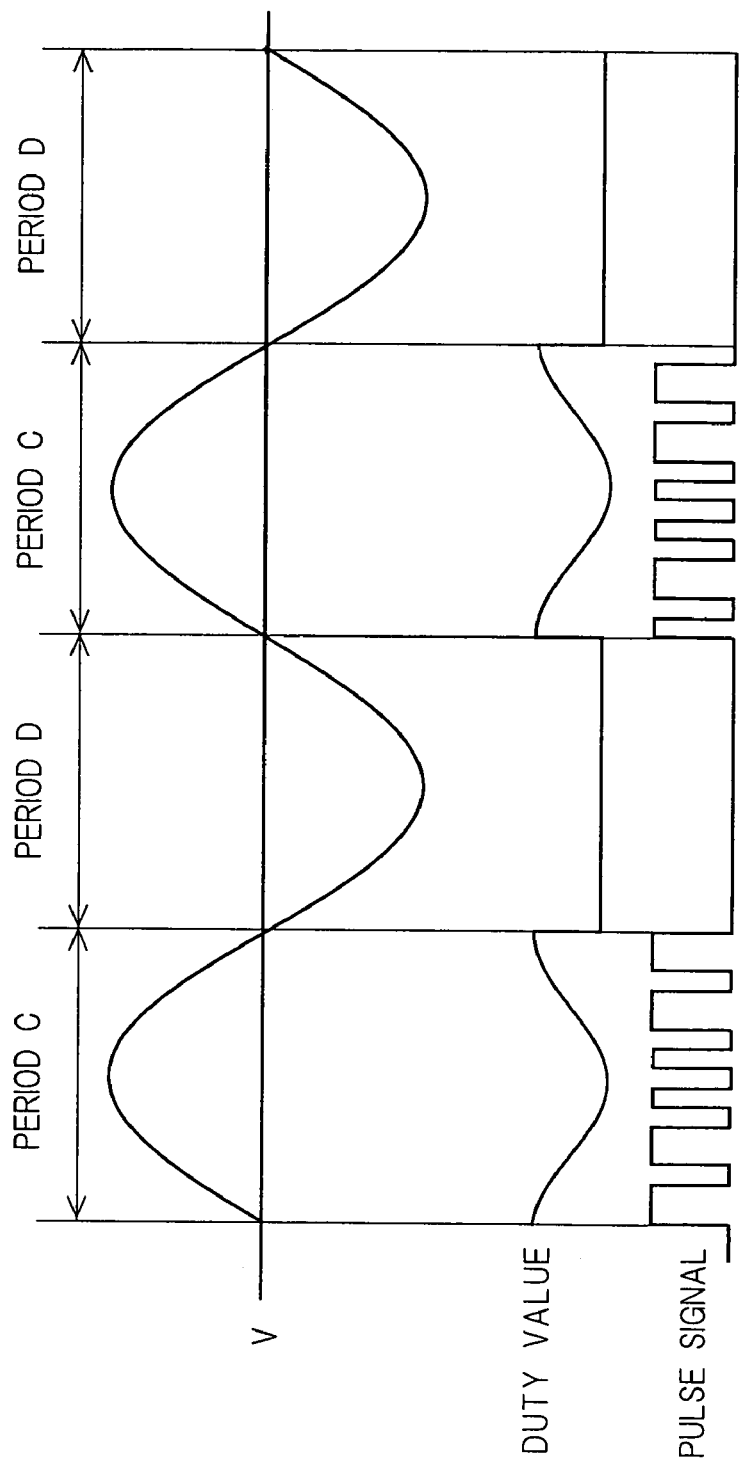
FIG. 24 is a waveform diagram showing an operation of the motor control apparatus in accordance with Embodiment 11 of the present invention.

The operation of the PWM command generation section 24b and the operation of the double-voltage rectifying boosting circuit 25 will be described referring to FIG. 24.

In a period (hereafter referred to as period C) in which the output voltage at the terminal of the single-phase AC power source 5, connected to the inductor 300, is higher than the output voltage at the terminal thereof not connected to the inductor 300, a current flows to the capacitor 306. On the other hand, in a period (hereafter referred to as period D) in which the output voltage at the terminal of the single-phase AC power source 5, not connected to the inductor 300, is higher, a current flows to the capacitor 307.

Hence, in period C, a current similar to the current input to a conventional double-voltage rectifying circuit flows from the single-phase AC power source 5. If the inductor 300 is made smaller in this state, the power factor lowers. In Embodiment 11, the PWM command generation section 24b outputs a PWM signal for PWM driving the switching device of the double-voltage rectifying boosting circuit 25 in period C so that the power factor does not lower.

In period D, the configuration in accordance with Embodiment 11 becomes similar to the configuration of the circuit explained in the descriptions of the aforementioned Embodiment 7, whereby the power factor does not lower.

The PWM command generation section 24b in accordance with Embodiment 11 differs from the PWM command generation section 24 in accordance with the above-mentioned Embodiment 10 in that the PWM signal is not output to the double-voltage rectifying boosting circuit 25 in period D.

The two capacitors of the conventional double-voltage rectifying circuit have nearly the same capacitance and they are aluminum electrolytic capacitors being large in capacitance. However, the capacitance of one of the two capacitors in accordance with Embodiment 11 of the present invention is set at a small value. Since the capacitance of one of the capacitors can be made small, the double-voltage rectifying boosting circuit 25 of the motor control apparatus in accordance with Embodiment 11 can be made smaller than the conventional double-voltage rectifying circuit.

Figure 23B:
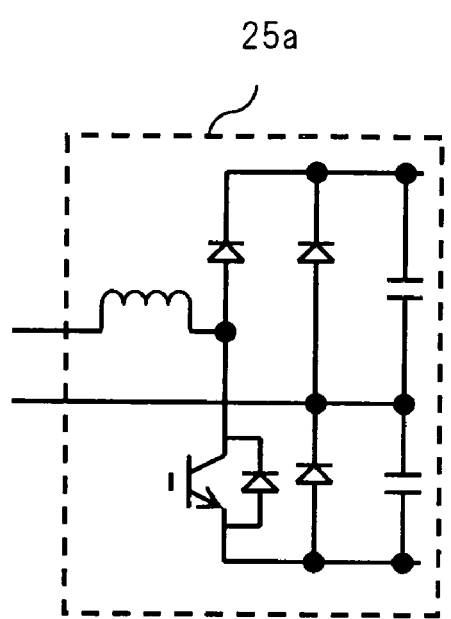
FIG. 23B is a circuit diagram showing another configuration of a double-voltage rectifying boosting circuit of the motor control apparatus in accordance with Embodiment 11 of the present invention.

FIG. 23B is a circuit diagram showing the configuration of a double-voltage rectifying boosting circuit 25a shown as another configuration of the double-voltage rectifying boosting circuit of the motor control apparatus in accordance with the present invention. An effect similar to that of the above-mentioned Embodiment 11 is also obtained even if the double-voltage rectifying boosting circuit 25a shown in FIG. 23B is used instead of the double-voltage rectifying boosting circuit 25 shown in FIG. 23A.

<<Embodiment 12>>

Next, a compressor incorporating one of the motor control apparatuses in accordance with Embodiments 1 to 11 will be described referring to FIG. 25. FIG. 25 is a block diagram showing the configuration of the compressor in accordance with Embodiment 12 of the present invention.

In FIG. 25, a compressor 41 connected to a single-phase AC power source 5 has a motor control apparatus 40 and a compression mechanism 42 driven by a brushless motor 3. The functions and configurations of the brushless motor 3 and the single-phase AC power source 5 in accordance with Embodiment 12 are similar to those in accordance with the aforementioned Embodiment 1. In addition, one of the motor control apparatuses in accordance with the aforementioned Embodiments 1 to 11 is applied to the motor control apparatus 40. The output of the motor control apparatus 40 is connected to the brushless motor 3 disposed inside the compression mechanism 42, whereby the brushless motor 3 is rotated and driven by the motor control apparatus 40. By the rotation of the brushless motor 3, the compression mechanism 42 sucks and compresses refrigerant gas and discharges high-pressure gas.

As described above, the motor control apparatus 40, one of the motor control apparatuses in accordance with the aforementioned Embodiments 1 to 11 of the present invention, is made smaller and lighter than the conventional motor control apparatuses. Hence, the present invention can provide the compressor 41 that is made compact by the integration of the compression mechanism 42 with the motor control apparatus 40 as explained in the descriptions of Embodiment 12.

<<Embodiment 13>>

Figure 26:
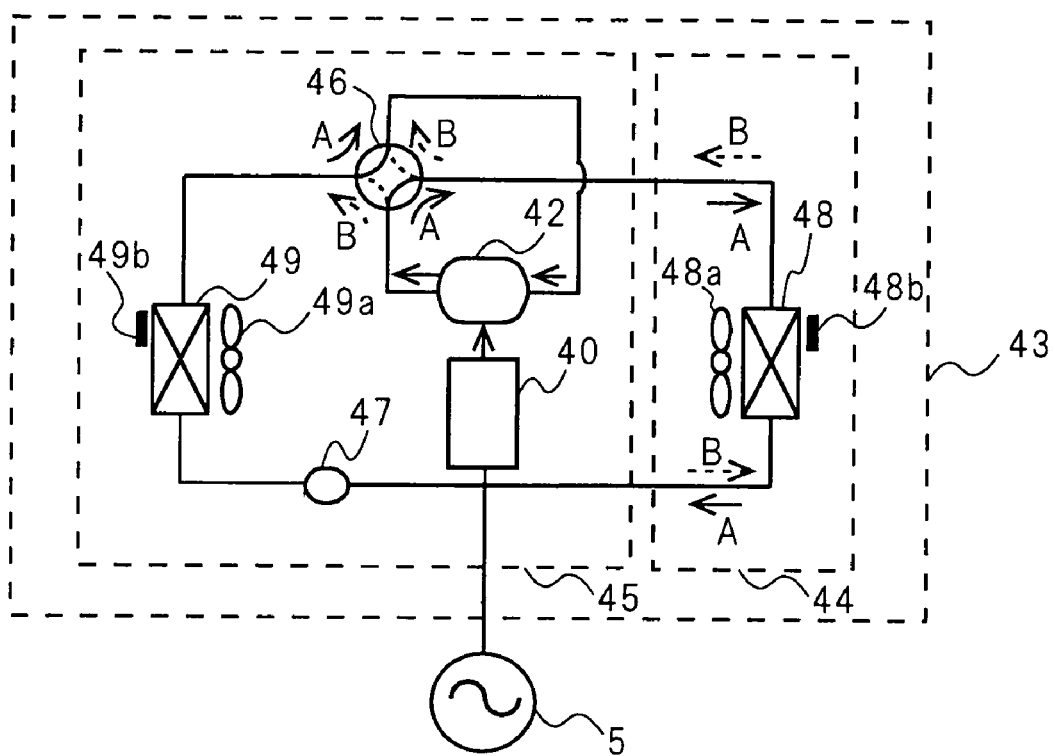
FIG. 26 is a block diagram showing the configuration of an air conditioner in accordance with Embodiment 13 of the present invention.

FIG. 26 is a block diagram showing the configuration of an air conditioner in accordance with Embodiment 13 of the present invention.

The air conditioner 43 in accordance with Embodiment 13 has an indoor unit 44 and an outdoor unit 45 and is used to cool or heat a room. The compression mechanism 42 of the air conditioner 43 circulates a refrigerant between the indoor unit 44 and the outdoor unit 45. The motor control apparatus 40 connected to the single-phase AC power source 5 drives and controls a brushless motor disposed inside the compression mechanism 42. The functions and configurations of the brushless motor and the single-phase AC power source 5 in accordance with Embodiment 13 are similar to those in accordance with the aforementioned Embodiment 1. In addition, one of the motor control apparatuses in accordance with the aforementioned Embodiments 1 to 11 is applied to the motor control apparatus 40.

In the air conditioner 43 in accordance with Embodiment 13, the indoor unit 44 has an indoor-side heat exchanger 48, and the outdoor unit 45 has a four-way valve 46, a throttle device 47 and an outdoor-side heat exchanger 49, thereby forming a refrigerant circulation passage.

The indoor-side heat exchanger 48 has a blower 48a for raising the performance of heat exchange and a temperature sensor 48b for measuring the temperature of the indoor-side heat exchanger 48 or the temperature therearound. The outdoor-side heat exchanger 49 has a blower 49a for raising the performance of heat exchange and a temperature sensor 49b for measuring the temperature of the outdoor-side heat exchanger 49 or the temperature therearound.

In the air conditioner 43 in accordance with Embodiment 13, the compression mechanism 42 and the four-way valve 46 are disposed in the refrigerant circulation passage between the indoor-side heat exchanger 48 and the outdoor-side heat exchanger 49. In the air conditioner 43 in accordance with Embodiment 13, the direction of the refrigerant flowing through the refrigerant circulation passage is changed by the selection operation of the four-way valve 46. For example, in the refrigerant circulation passage of the air conditioner 43, the refrigerant flows in the direction indicated by arrow A. The refrigerant having passed through the outdoor-side heat exchanger 49 is sucked to the compression mechanism 42 via the four-way valve 46. The refrigerant discharged from the compression mechanism 42 is supplied to the indoor-side heat exchanger 48. On the other hand, when the selection operation of the four-way valve 46 is performed, the refrigerant flows in the direction indicated by arrow B. The refrigerant having passed through the indoor-side heat exchanger 48 is sucked to the compression mechanism 42 via the four-way valve 46. The refrigerant discharged from the compression mechanism 42 is supplied to the outdoor-side heat exchanger 49. As described above, the flowing direction of the refrigerant is changed by the selection operation of the four-way valve 46.

The throttle device 47 disposed in the refrigerant circulation passage between the indoor-side heat exchanger 48 and the outdoor-side heat exchanger 49 has a function of throttling the flow rate of the circulating refrigerant and also has a function of automatically adjusting the flow rate of the refrigerant. While the refrigerant circulates through the refrigerant circulation passage, the throttle device 47 throttles the flow rate of the liquid refrigerant sent from a condenser to an evaporator to allow the liquid refrigerant to expand immediately after the throttling and to supply the exact amount of the refrigerant required for the evaporator.

In the air conditioner 43, the indoor-side heat exchanger 48 operates as a condenser during heating and operates as an evaporator during cooling. In addition, the outdoor-side heat exchanger 49 operates as an evaporator during heating and operates as a condenser during cooling. In the condenser, the heat of the refrigerant gas flowing therethrough and having high temperature and pressure is removed by the air supplied thereto, whereby the refrigerant gas is liquefied gradually. In the vicinity of the outlet of the condenser, the refrigerant becomes a liquid state or a mixture state of liquid and gas being high in pressure. This is equivalent to a phenomenon wherein the refrigerant radiates heat to the atmosphere and is liquefied. Furthermore, the refrigerant converted into a liquid state or a mixture state of liquid and gas being low in temperature and pressure by the throttle device 47 flows to the evaporator. When air from the room is supplied to the evaporator in this state, the refrigerant removes a large amount of heat from the air and evaporates, thereby becoming a refrigerant having an increased amount of gas. The air from which a large amount of heat is removed by the evaporator is discharged as a cold blast from the air outlet of the air conditioner 43.

In the air conditioner 43, the command rotation speed of the brushless motor is set on the basis of the operation state, that is, a target temperature set for the air conditioner 43, the actual room temperature and the outdoor air temperature. Like the motor control apparatus in accordance with the aforementioned Embodiment 1, the motor control apparatus 40 controls the rotation speed of the brushless motor of the compression mechanism 42 on the basis of the preset command rotation speed.

A method of controlling the rotation speed of the brushless motor to the preset command rotation speed will be described below.

It is assumed that the command rotation speed is $\omega^*$ and that the actual rotation speed of the brushless motor is $\omega$. In the case of a brushless motor having a position sensor, $\omega$ can be obtained by differentiating the signal of the position sensor. In the case of a brushless motor having no position sensor, $\omega$ should be the estimated rotation speed $\omega$ obtained by differentiating the estimated phase $\theta$ as explained in the descriptions of Embodiment 3. The error between the command rotation speed $\omega^*$ and the actual rotation speed $\omega$ is calculated. A value obtained by subjecting the error to PI control is output as a comprehensive current command value $I^*$. By using the current phase command value $\beta^*$ stored inside the control section 4, the d-axis current command value Id* and the q-axis current command value Iq* are calculated according to the following equations (12) and (13).

$$Id^* = I^* \times \sin \beta^* \quad (12)$$

$$Iq^* = I^* \times \cos \beta^* \quad (13)$$

$\beta^*$ is a value for determining the operation state of the brushless motor 3. This value may be a predetermined value or may be changed depending on the operation state of the brushless motor. By the addition of the above-mentioned function to the control section 4, in the case when the actual rotation speed is lower than the command rotation speed, the d-axis current command value and the q-axis current command value are increased by PI control. Hence, the output torque of the brushless motor 3 increases and the brushless motor accelerates. By this operation of the control section 4, the motor control apparatus operates so that the preset command rotation speed is obtained, whereby the brushless motor rotates at the command rotation speed.

Next, the operation of the air conditioner 43 in accordance with Embodiment 13 will be described.

In the air conditioner 43 in accordance with Embodiment 13, when a drive voltage is applied from the motor control apparatus 40 to the compression mechanism 42, the refrigerant circulates through the refrigerant circulation passage. During this circulation, heat exchange is carried out at the heat exchanger 48 of the indoor unit 44 and the heat exchanger 49 of the outdoor unit 45. In other words, in the air conditioner 43, the refrigerant sealed in the closed refrigerant circulation passage is circulated by the compression mechanism 42, whereby a known heat pump cycle is formed in the closed refrigerant circulation passage. This heats or cools the room.

For example, in the case when the air conditioner 43 carries out heating operation, the four-way valve 46 is set by user's operation so that the refrigerant flows in the direction indicated by arrow A. In this case, the heat exchanger 48 operates as a condenser and discharges heat by virtue of the circulation of the refrigerant through the refrigerant circulation passage. This heats the room.

On the other hand, in the case when the air conditioner 43 carries out cooling operation, the four-way valve 46 is set by user's operation so that the refrigerant flows in the direction indicated by arrow B. In this case, the heat exchanger 48 operates as an evaporator and absorbs heat from the ambient air by virtue of the circulation of the refrigerant through the refrigerant circulation passage. This cools the room.

In the air conditioner 43 in accordance with Embodiment 13, the command rotation speed is determined on the basis of a target temperature set for the air conditioner 43, the actual room temperature and the outdoor air temperature. Like the motor control apparatus in accordance with the aforementioned Embodiment 1, the motor control apparatus 40 controls the rotation speed of the brushless motor of the compression mechanism 42 on the basis of the determined command rotation speed. As a result, the air conditioner 43 in accordance with Embodiment 13 can carry out comfortable cooling and heating.

Since the motor control apparatus 40 of the air conditioner 43 in accordance with Embodiment 13 is smaller and lighter than the conventional motor control apparatus, the motor control apparatus 40 has a higher degree of freedom of arrangement inside the outdoor unit 45. Production design can thus be made easier. In addition, by making the motor control apparatus smaller, it is possible to provide an outdoor unit 45 that is smaller and lighter, whereby the outdoor unit can be installed more easily by consumers. These excellent effects can be attained.

In the case when brushless motors are used to drive the blower 48a of the indoor-side heat exchanger 48 and the blower 49a of the outdoor-side heat exchanger 49 of the air conditioner 43 in accordance with Embodiment 13, the motor control apparatus for driving and controlling each of these brushless motors may be any one of the motor control apparatuses explained in the descriptions of Embodiments 1 to 11.

In the descriptions of Embodiment 13, the air conditioner capable of carrying out both cooling and heating is explained. In the case of an air conditioner only for cooling, the four-way valve 46 should be eliminated so that the refrigerant flows in the direction indicated by arrow B.

<<Embodiment 14>>

Figure 27:
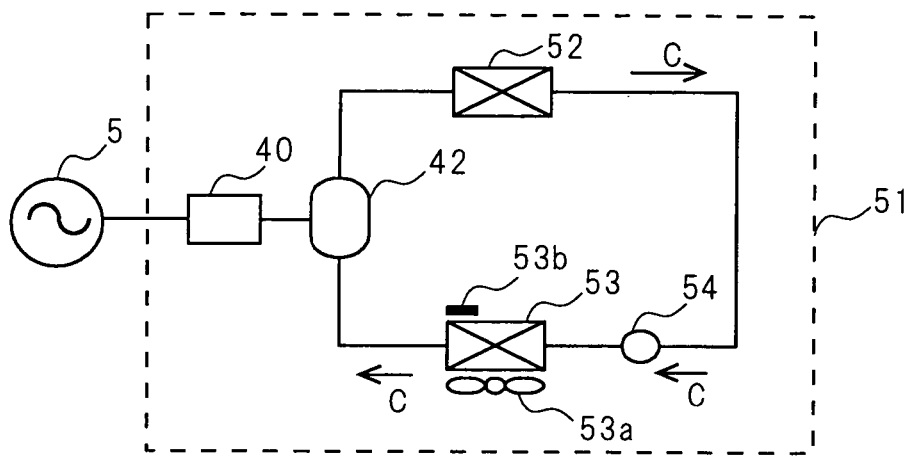
FIG. 27 is a block diagram showing the configuration of a refrigerator in accordance with Embodiment 14 of the present invention.

FIG. 27 is a block diagram showing the configuration of a refrigerator in accordance with Embodiment 14 of the present invention.

The refrigerator 51 in accordance with Embodiment 14 has a motor control apparatus 40, a compression mechanism 42, a condenser 52, a refrigeration chamber evaporator 53 and a throttle device 54.

In the refrigerator 51 in accordance with Embodiment 14, the compression mechanism 42, the condenser 52, the throttle device 54 and the refrigeration chamber evaporator 53 are disposed inside the refrigerant circulation passage. The motor control apparatus 40 is connected to a single-phase AC power source 5 serving as an input power source and drives and controls a brushless motor serving as the drive source of the compression mechanism 42.

The functions and configurations of the brushless motor disposed inside the compression mechanism 42 and the single-phase AC power source 5 serving as the input power source of the motor control apparatus 40 in accordance with Embodiment 14 are similar to those in accordance with the aforementioned Embodiment 1. In addition, one of the motor control apparatuses in accordance with the aforementioned Embodiments 1 to 11 is applied to the motor control apparatus 40.

Like the throttle device 47 of the air conditioner 43 in accordance with the aforementioned Embodiment 13, the throttle device 54 of the refrigerator 51 in accordance with Embodiment 14 throttles the flow rate of the refrigerant sent from the condenser 52 to allow the refrigerant to expand and to supply the exact amount of the refrigerant required for the evaporator 53 while the refrigerant circulates through the refrigerant circulation passage.

The condenser 52 condenses the refrigerant gas flowing therethrough and having high temperature and pressure and discharges the heat of the refrigerant to the outside. The heat of the refrigerant gas sent to the condenser 52 is removed by the outdoor air, and the refrigerant gas is liquefied gradually. In the vicinity of the outlet of the condenser 52, the refrigerant becomes a liquid state or a mixture state of liquid and gas being high in pressure.

The refrigeration chamber evaporator 53 evaporates the refrigerant having low temperature, thereby cooling the inside of the refrigerator. The refrigeration chamber evaporator 53 has a blower 53a for raising the efficiency of heat exchange and a temperature sensor 53b for detecting the temperature inside the refrigerator.

Next, the operation of the refrigerator 51 in accordance with Embodiment 14 will be described.

In the refrigerator 51 in accordance with Embodiment 14, when a drive voltage is applied from the motor control apparatus 40 to the brushless motor of the compression mechanism 42, the compression mechanism 42 is driven and the refrigerant circulates through the refrigerant circulation passage in the direction indicated by arrows C. During this circulation, heat exchange is carried out at the condenser 52 and the refrigeration chamber evaporator 53, thereby cooling the inside of the refrigerator.

In other words, the flow rate of the refrigerant condensed at the condenser 52 is throttled by the throttle device 54, whereby the refrigerant expands and becomes a refrigerant having low temperature. When the refrigerant having low temperature is sent to the refrigeration chamber evaporator 53, the refrigerant having low temperature in the refrigeration chamber evaporator 53 evaporates, thereby cooling the inside of the refrigerator. During this cooling, the air inside the refrigerator is forcibly sent to the refrigeration chamber evaporator 53 by the blower 53a, whereby heat exchange is carried out efficiently by the refrigeration chamber evaporator 53.

In addition, in the refrigerator 51 in accordance with Embodiment 14, the command rotation speed is set depending on a target temperature set for the refrigerator 51 and the temperature inside the refrigerator. Like the motor control apparatus in accordance with Embodiment 13, the motor control apparatus 40 controls the rotation speed of the brushless motor of the compression mechanism 42 on the basis of the preset command rotation speed value. As a result, the temperature inside the refrigerator 51 is maintained at the target temperature.

Since the motor control apparatus 40 of the refrigerator 51 in accordance with Embodiment 14 is smaller and lighter than the conventional motor control apparatus as described above, the motor control apparatus 40 has a higher degree of freedom of arrangement inside the refrigerator than the conventional motor control apparatus. In addition, the higher degree of freedom of arrangement of the motor control apparatus has an effect of increasing the capacity inside the refrigerator 51. Furthermore, since the motor control apparatus being light in weight can be provided, the weight of the refrigerator 51 can be reduced.

In the case when the brushless motor 3 is used to drive the blower 53a of the refrigerator 51 in accordance with Embodiment 14, the motor control apparatus 40 for driving and controlling the brushless motor may be any one of the motor control apparatuses explained in the descriptions of the aforementioned Embodiments 1 to 11.

<<Embodiment 15>>

Figure 28:
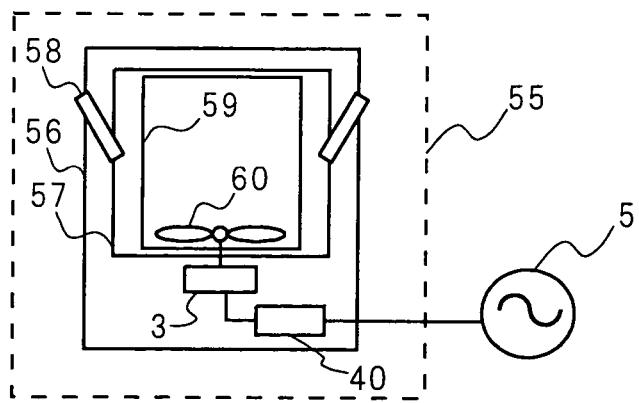
FIG. 28 is a block diagram showing the configuration of an electric washing machine in accordance with Embodiment 15 of the present invention.

FIG. 28 is a block diagram showing the configuration of an electric washing machine in accordance with Embodiment 15 of the present invention.

The electric washing machine 55 in accordance with Embodiment 15 has an outer frame 56. Inside the outer frame 56, a tub 57 is suspended by suspension rods 58. Inside the tub 57, a washing and dewatering drum 59 is disposed so as to be rotatable. At the bottom of the washing and dewatering drum 59, an agitator 60 is disposed so as to be rotatable.

A brushless motor 3 for rotating the washing and dewatering drum 59 and the agitator 60 is disposed in the space under the tub 57 inside the outer frame 56. In addition, a motor control apparatus 40, connected to the single-phase AC power source 5, for driving and controlling the brushless motor 3 is installed in the outer frame 56.

The functions and configurations of the brushless motor disposed inside the outer frame 56 and the single-phase AC power source 5 serving as the input power source of the motor control apparatus 40 in accordance with Embodiment 15 are similar to those in accordance with the aforementioned Embodiment 1. In addition, one of the motor control apparatuses in accordance with the aforementioned Embodiments 1 to 111 is applied to the motor control apparatus 40.

In the electric washing machine 55 in accordance with Embodiment 15, a command signal indicating the command rotation speed depending on user's operation is input from a microcomputer (not shown) for controlling the operation of the electric washing machine 55 to the motor control apparatus 40.

Next, the operation of the electric washing machine 55 in accordance with Embodiment 15 will be described.

In the electric washing machine 55 in accordance with Embodiment 15, when a user carries out a predetermined operation, the command signal is input from the microcomputer to the motor control apparatus 40, whereby a drive voltage is applied to the brushless motor 3. Hence, the brushless motor 3 is driven, and the agitator 60 or the washing and dewatering drum 59 is rotated, whereby clothes and the like inside the washing and dewatering drum 59 are washed or dewatered. During this operation, in the electric washing machine 55 in accordance with Embodiment 15, the rotation speed of the brushless motor 3 is controlled by the motor control apparatus 40 on the basis of the command rotation speed indicated by the command signal sent from the microcomputer, just as in the case of the aforementioned Embodiment 13. As a result, in the electric washing machine 55, proper operation is carried out depending on the amount and dirtiness of the clothes and the like to be washed.

Since the motor control apparatus 40 being made compact in size is used for the electric washing machine 55 in accordance with Embodiment 15 as described above, the present invention has an effect of increasing the capacity of the washing and dewatering drum even when the outside dimensions of the electric washing machine are the same as those of a conventional electric washing machine. In addition, since the motor control apparatus 40 being light in weight is used for the electric washing machine 55 in accordance with the present invention, the present invention has an excellent effect of reducing the weight of the whole washing machine.

In the electric washing machine 55 in accordance with Embodiment 15 of the present invention, the motor control apparatus 40 for driving and controlling the brushless motor 3 may be any one of the motor control apparatuses explained in the descriptions of the aforementioned Embodiments 1 to 11.

<<Embodiment 16>>

Figure 29:
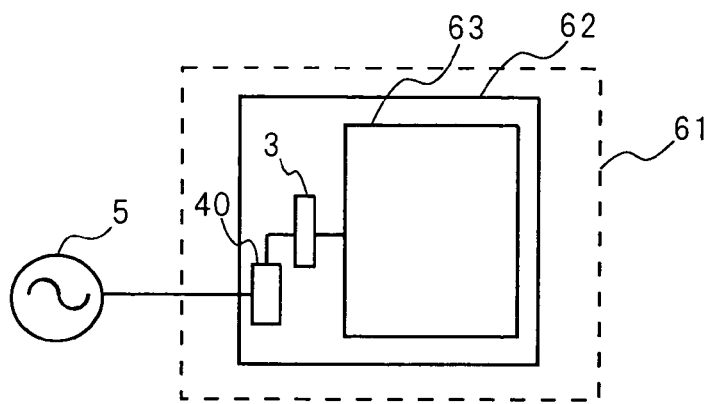
FIG. 29 is a block diagram showing the configuration of an electric dryer in accordance with Embodiment 16 of the present invention.

FIG. 29 is a block diagram showing the configuration of an electric dryer in accordance with Embodiment 16 of the present invention.

The electric dryer 61 in accordance with Embodiment 16 has an outer frame 62. Inside the outer frame 62, a drum 63 is disposed so as to be rotatable. A brushless motor 3 is connected to the drum 63 so that the drum 63 is rotated by the brushless motor 3.

The functions and configurations of the brushless motor 3 and the motor control apparatus 40 disposed inside the outer frame 62 and the single-phase AC power source 5 in accordance with Embodiment 16 are similar to those in accordance with the aforementioned Embodiment 1. In addition, one of the motor control apparatuses in accordance with the aforementioned Embodiments 1 to 11 is applied to the motor control apparatus 40.

In the electric dryer 61 in accordance with Embodiment 16, a command signal indicating the command rotation speed depending on user's operation is input from a microcomputer (not shown) for controlling the operation of the electric dryer 61 to the motor control apparatus 40.

Next, the operation of the electric dryer 61 in accordance with Embodiment 16 will be described.

In the electric dryer 61 in accordance with Embodiment 16, when a user carries out a predetermined operation, the command signal is input from the microcomputer to the motor control apparatus 40. Hence, a drive voltage is applied to the brushless motor 3. As a result, the brushless motor 3 is driven, and the drum 63 is rotated, whereby clothes and the like inside the drum 63 are dried.

During this operation, in the electric dryer 61 in accordance with Embodiment 16, the rotation speed of the brushless motor 3 is controlled by the motor control apparatus 40 on the basis of the command rotation speed indicated by the command signal sent from the microcomputer, just as in the case of the aforementioned Embodiment 13. As a result, in the electric dryer 61 in accordance with Embodiment 16, proper operation is carried out depending on the amount and dirtiness of the clothes and the like to be dried.

Since the motor control apparatus 40 being made compact in size is used for the electric dryer 61 in accordance with Embodiment 16 as described above, the present invention has an effect of increasing the capacity of the drum even when the outside dimensions of the electric dryer are the same as those of a conventional electric dryer. In addition, since the motor control apparatus 40 being light in weight is used for the electric dryer in accordance with the present invention, the present invention has an effect of reducing the weight of the whole dryer.

In the electric dryer 61 in accordance with Embodiment 16 of the present invention, the motor control apparatus 40 for driving and controlling the brushless motor 3 may be any one of the motor control apparatuses explained in the descriptions of the aforementioned Embodiments 1 to 11.

<<Embodiment 17>>

Figure 30:
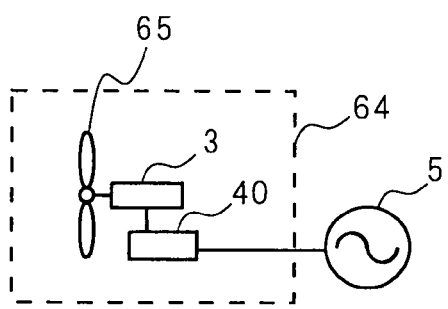
FIG. 30 is a block diagram showing the configuration of a blower in accordance with Embodiment 17 of the present invention.

FIG. 30 is a block diagram showing the configuration of a blower in accordance with Embodiment 17 of the present invention.

The blower 64 in accordance with Embodiment 17 has a fan 65, a brushless motor 3 for rotating and driving the fan 65 and a motor control apparatus 40 for driving and controlling the brushless motor 3. The motor control apparatus 40 is connected to a single-phase AC power source 5 so that a single-phase AC voltage is applied.

The functions and configurations of the brushless motor 3 and the motor control apparatus 40 disposed inside the blower 64 and the single-phase AC power source 5 in accordance with Embodiment 17 are similar to those in accordance with the aforementioned Embodiment 1. In addition, one of the motor control apparatuses in accordance with the aforementioned Embodiments 1 to 11 is applied to the motor control apparatus 40.

In the blower 64 in accordance with Embodiment 17, a command signal indicating the command rotation speed depending on user's operation is input from a microcomputer (not shown) for controlling the operation of the blower 64 to the motor control apparatus 40.

Next, the operation of the blower 64 in accordance with Embodiment 17 will be described.

In the blower 64 in accordance with Embodiment 17, when a user carries out a predetermined operation, the command signal is input from the microcomputer to the motor control apparatus 40. When the command signal is input to the motor control apparatus 40, a drive voltage is applied from the motor control apparatus 40 to the brushless motor 3. As a result, the brushless motor 3 is driven, and the fan 65 is rotated, whereby air blasting is carried out. During this operation, in the blower 64 in accordance with Embodiment 17, the output of the brushless motor 3 is controlled by the motor control apparatus 40 on the basis of the command signal from the microcomputer, just as in the case of the aforementioned Embodiment 13. As a result, in the blower 64, the flow rate and strength of the blast are adjusted.

Since the motor control apparatus 40 being made compact in size and light in weight is used for the blower 64 in accordance with Embodiment 17 as described above, the blower itself can be made smaller and lighter than a conventional blower. Hence, the present invention can provide a blower having excellent portability.

In the blower 64 in accordance with Embodiment 17 of the present invention, the motor control apparatus 40 for driving and controlling the brushless motor 3 may be any one of the motor control apparatuses explained in the descriptions of the aforementioned Embodiments 1 to 11.

<<Embodiment 18>>

Figure 31:
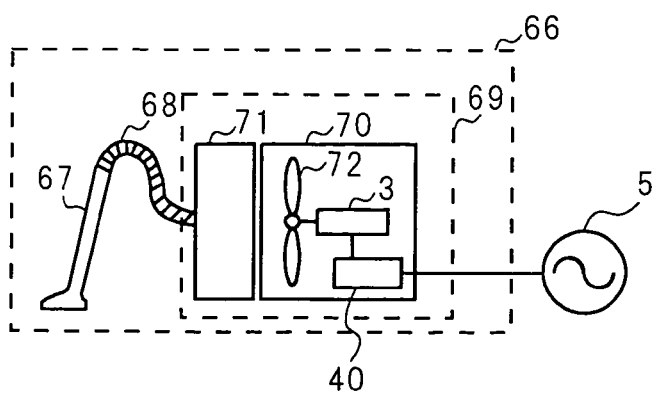
FIG. 31 is a block diagram showing the configuration of an electric vacuum cleaner in accordance with Embodiment 18 of the present invention.

FIG. 31 is a block diagram showing the configuration of an electric vacuum cleaner in accordance with Embodiment 18 of the present invention.

The electric vacuum cleaner 66 in accordance with Embodiment 18 comprises a cleaner body 69, a floor-use suction tool 67 having a suction port formed in the bottom face, and a dust suction hose 68, one end of which is connected to the floor-use suction tool 67 and the other end of which is connected to the cleaner body 69.

The cleaner body 69 in accordance with Embodiment 18 comprises a dust chamber 71 to which the end of the dust suction hose 68 on the cleaner body side is connected, and an electric blower 70 disposed on the outlet side of the dust chamber 71. The electric blower 70 comprises a fan 72 disposed so as to be opposed to the outlet side of the dust chamber 71, a brushless motor 3 for rotating the fan 72, and a motor control apparatus 40 for driving and controlling the brushless motor 3. The motor control apparatus 40 is connected to a single-phase AC power source 5 so that a single-phase AC voltage is applied. By the rotation of the fan 72, air is sucked from the suction port formed in the bottom face of the floor-use suction tool 67 via the dust suction hose 68 and the dust chamber 71.

The functions and configurations of the brushless motor 3, the motor control apparatus 40 and the single-phase AC power source 5 in accordance with Embodiment 18 are similar to those in accordance with the aforementioned Embodiment 1. In addition, one of the motor control apparatuses in accordance with the aforementioned Embodiments 1 to 11 is applied to the motor control apparatus 40.

In the electric vacuum cleaner 66 in accordance with Embodiment 18, a command signal indicating the command rotation speed depending on user's operation is input from a microcomputer (not shown) for controlling the operation of the fan 72 to the motor control apparatus 40.

Next, the operation of the electric vacuum cleaner 66 in accordance with Embodiment 18 will be described.

In the electric vacuum cleaner 66 in accordance with Embodiment 18, when a user carries out a predetermined operation, the command signal is input from the microcomputer to the motor control apparatus 40. When the command signal is input to the motor control apparatus 40, a drive voltage is applied from the motor control apparatus 40 to the brushless motor 3, and the brushless motor 3 is driven. As a result, the fan 72 is rotated, whereby a suction force is generated inside the cleaner body 69. By the suction force generated inside the cleaner body 69, air is sucked from the suction port formed in the bottom face of the floor-use suction tool 67 that is connected to the cleaner body 69 via the dust suction hose 68. Hence, dust on the floor to be cleaned is sucked together with air through the suction port of the floor-use suction tool 67 and collected in the dust chamber 71 of the cleaner body 69. During this operation, in the electric vacuum cleaner 66 in accordance with Embodiment 18, the rotation speed of the brushless motor 3 is controlled by the motor control apparatus 40 on the basis of the command signal from the microcomputer, just as in the case of the aforementioned Embodiment 13. As a result, in the electric vacuum cleaner 66 in accordance with Embodiment 18, the rotation speed of the brushless motor 3 is controlled, whereby the intensity of the suction force is adjusted.

Since the motor control apparatus 40 being made compact in size and light in weight is used for the electric vacuum cleaner 66 in accordance with Embodiment 18 as described above, the cleaner body 69 can be made smaller and lighter than that of a conventional electric vacuum cleaner. Hence, the present invention can provide an electric vacuum cleaner having excellent portability and ease of handling by the user.

In the electric vacuum cleaner 66 in accordance with Embodiment 18 of the present invention, the motor control apparatus 40 for driving and controlling the brushless motor 3 may be any one of the motor control apparatuses explained in the descriptions of the aforementioned Embodiments 1 to 11.

<<Embodiment 19>>

Figure 32:
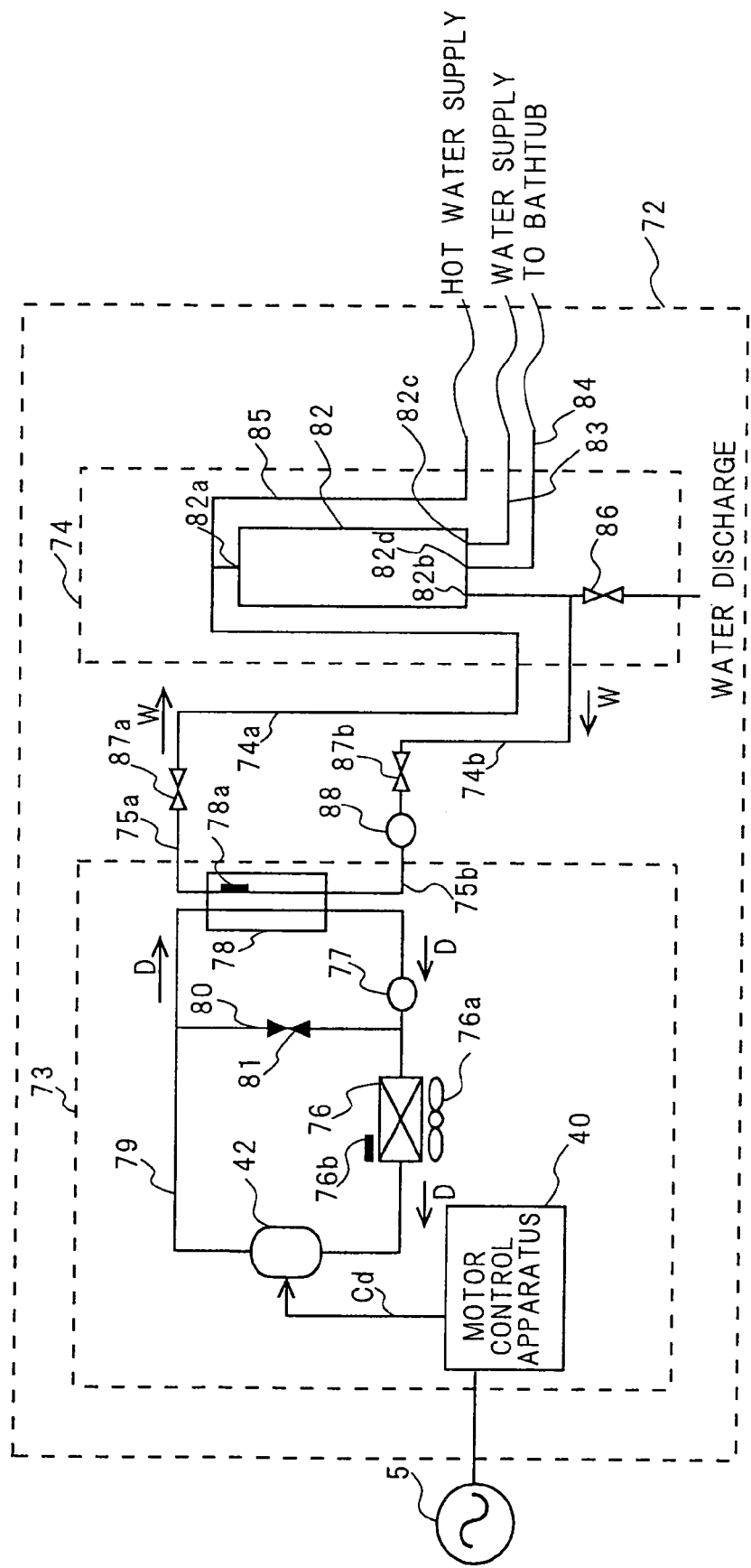
FIG. 32 is a block diagram showing the configuration of a heat pump water heater in accordance with Embodiment 19 of the present invention.
Figure 33:
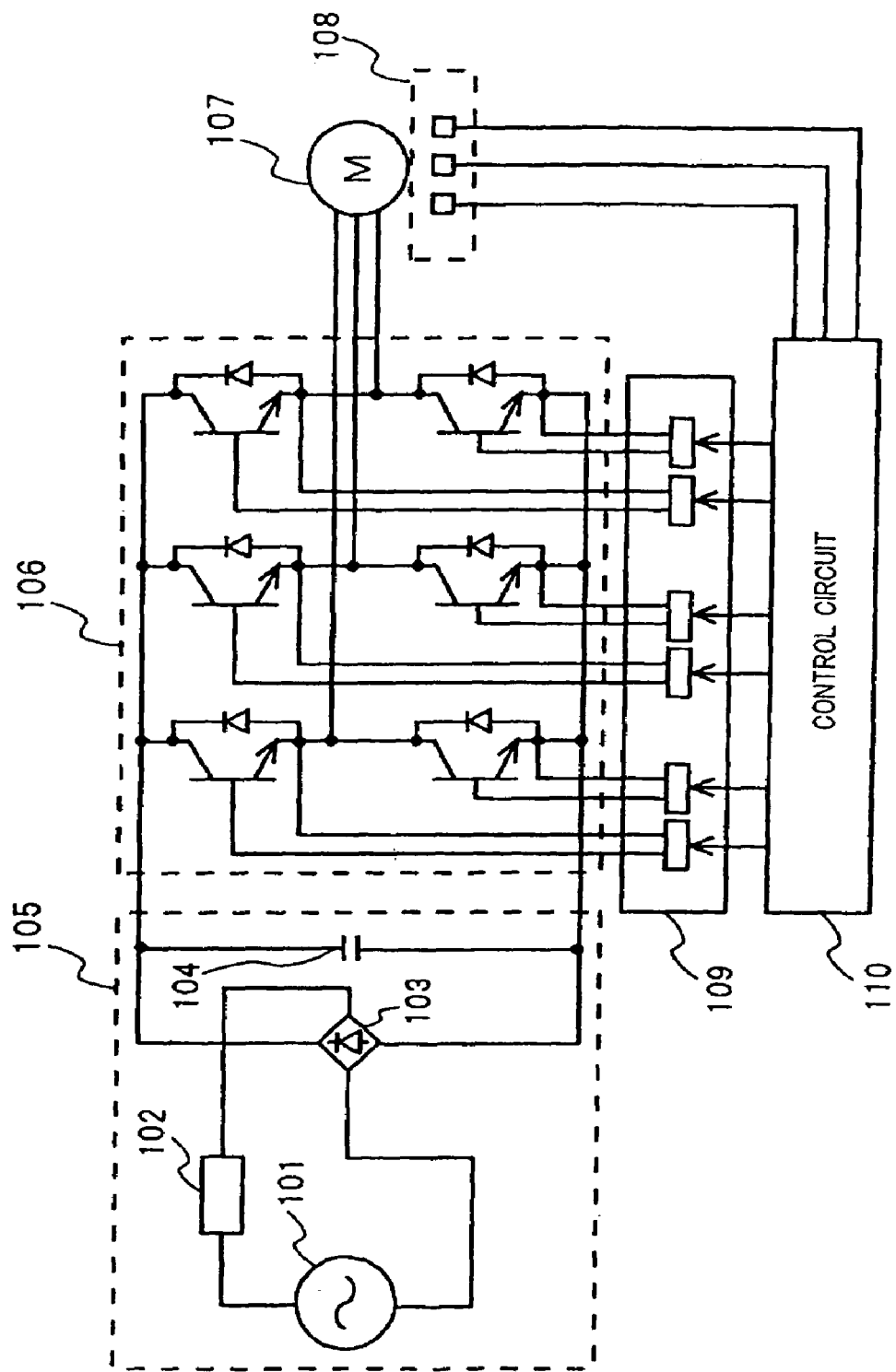
FIG. 33 is the block diagram showing the configuration of the motor control apparatus as the first conventional technology.
Figure 34:
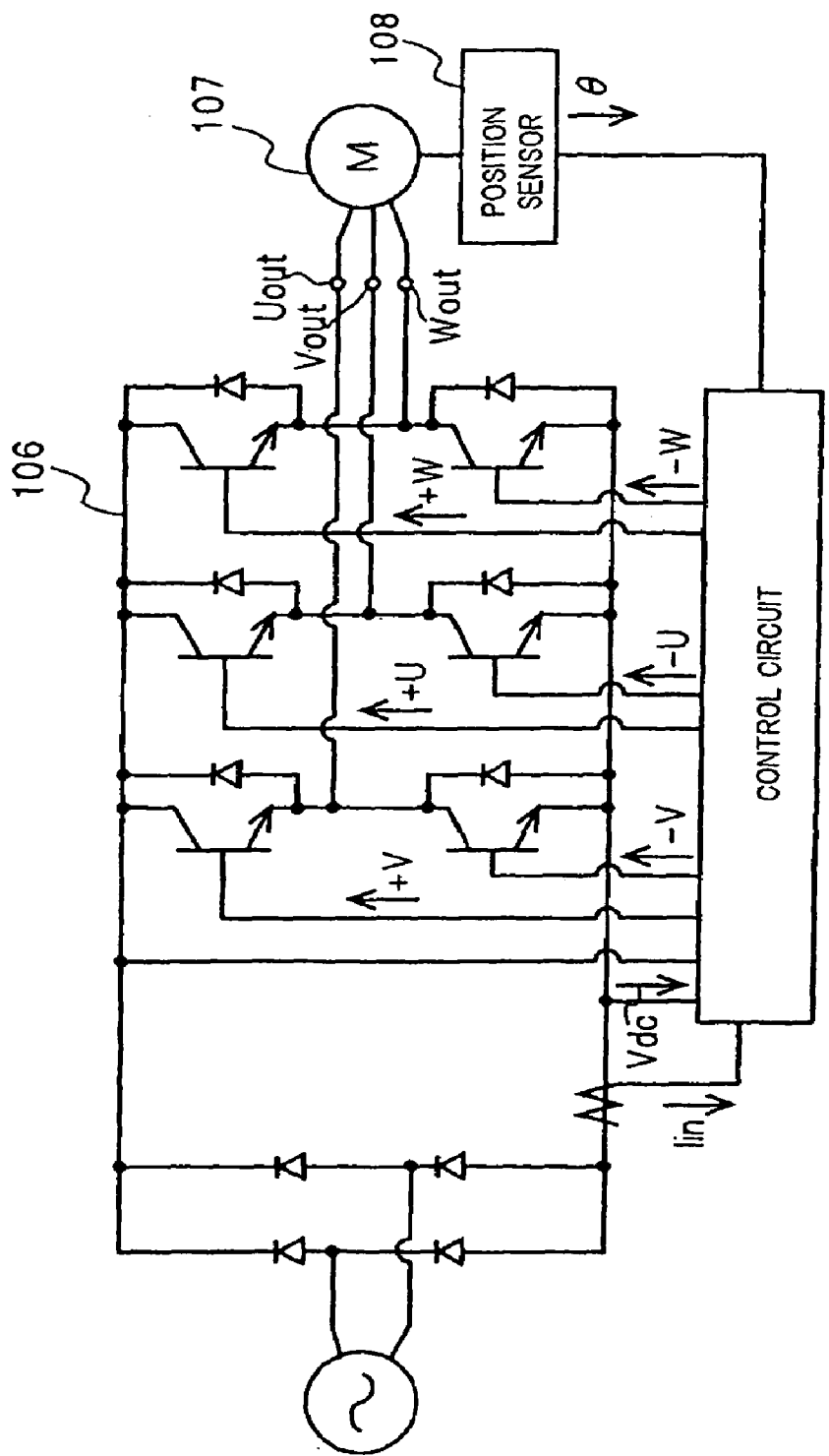
FIG. 34 is the block diagram showing the configuration of the motor control apparatus as the second conventional technology.

FIG. 32 is a block diagram showing the configuration of a heat pump water heater in accordance with Embodiment 19 of the present invention.

The heat pump water heater 72 in accordance with Embodiment 19 comprises a refrigeration cycle unit 73 for heating supplied water and discharging hot water, a hot-water storage unit 74 for storing the hot water discharged from the refrigeration cycle unit 73, and water pipes 74a, 74b, 75a and 75b for connecting these components.

The refrigeration-cycle unit 73 comprises a compression mechanism 42, an air heat exchanger 76, a throttle device 77 and a water heat exchanger 78, thereby forming a refrigerant circulation passage. In addition, the refrigeration cycle unit 73 is provided with a motor control apparatus 40 connected to a single-phase AC power source 5 so that a single-phase AC voltage is supplied.

The functions and configurations of the brushless motor 3, the motor control apparatus 40 and the single-phase AC power source 5 in accordance with Embodiment 19 are similar to those in accordance with the aforementioned Embodiment 1. In addition, one of the motor control apparatuses in accordance with the aforementioned Embodiments 1 to 11 is applied to the motor control apparatus 40.

Like the throttle device 47 of the air conditioner 43 in accordance with the aforementioned Embodiment 13 shown in FIG. 26, the throttle device 77 throttles the flow rate of the liquid refrigerant sent from the water heat exchanger 78 to the air heat exchanger 76 to allow the liquid refrigerant to expand immediately after the throttling.

The water heat exchanger 78 is a condenser for heating the water supplied to the refrigeration cycle unit 73 and has a temperature sensor 78a for detecting the temperature of the heated water. The air heat exchanger 76 is an evaporator for absorbing heat from ambient atmosphere and has a blower 76a for raising the performance of heat exchange and a temperature sensor 76b for detecting the ambient atmosphere.

A refrigerant pipe 79 is used to connect the compression mechanism 42, the water heat exchanger 78, the throttle device 77 and the air heat exchanger 76, thereby forming a refrigerant circulation passage. A refrigerant is circulated along the refrigerant circulation passage formed by the compression mechanism 42, the water heat exchanger 78, the throttle device 77 and air heat exchanger 76. The refrigerant pipe 79 is further connected to a defrosting bypass pipe 80 so that the refrigerant discharged from the compression mechanism 42 is supplied to the air heat exchanger 76 without passing through the water heat exchanger 78 and the throttle device 77. A defrosting bypass valve 81 is provided in a part of the defrosting bypass pipe 80.

The hot-water storage unit 74 has a hot-water storage tank 82 for storing water or hot water. A water supply pipe 83 for supplying water from the outside to the inside of the hot-water storage tank 82 is connected to the water receiving port 82c of the hot-water storage tank 82. In addition, a bathtub-use hot-water supply pipe 84 for supplying hot water from the hot-water storage tank 82 to a bathtub is connected to the hot-water outlet port 82*d* of the hot-water storage tank 82. Furthermore, a hot-water supply pipe 85 for supplying the hot water stored in the tank 82 to the outside is connected to the water inlet-outlet port 82*a* of the hot-water storage tank 82.

The water heat exchanger 78 of the refrigeration cycle unit 73 is connected to the hot-water storage tank 82 via the water pipes 74*a*, 74*b*, 75*a* and 75*b*. Hence, a water circulation passage is formed between the hot-water storage tank 82 and the water heat exchanger 78.

The water pipe 74*b* is a pipe disposed on the hot-water storage tank side and is used to supply water from the hot-water storage tank 82 to the water heat exchanger 78. One end of the water pipe 74*b* is connected to the water outlet port 82*b* of the hot-water storage tank 82, and the other end is connected to the water pipe 75*b* on the water supply side of the water heat exchanger 78 via a joint 87*b*. In addition, a water discharge valve 86 for discharging water or hot water from the hot-water storage tank 82 is installed at the one end of the water pipe 74*b*.

The water pipe 74*a* is a pipe disposed on the hot-water storage tank side and is used to return water from the water heat exchanger 78 to the hot-water storage tank 82. One end of the water pipe 74*a* is connected to the water inlet-outlet port 82*a* of the hot-water storage tank 82, and the other end is connected to the water pipe 75*a* on the water discharge side of the water heat exchanger 78 via a joint 87*a*.

A pump 88 for circulating water through the water circulation passage is provided in the middle of the water pipe 75*b* on the water supply side. The water pipe 75*b* is used to connect the water heat exchanger 78 to the joint 87*b*.

In the heat pump water heater 72 in accordance with Embodiment 19, the command rotation speed of the brushless motor 3 is determined on the basis of the operation state of the heat pump water heater 72, that is, a target hot-water temperature set at the heat pump water heater 72, the temperature of the water supplied from the hot-water storage unit 74 to the water heat exchanger 78 of the refrigeration cycle unit 73 and the temperature of the outdoor air. Then, the motor control apparatus 40 determines motor output required for the brushless motor 3 of the compression mechanism 42 on the basis of the command rotation speed.

Next, the operation of the heat pump water heater 72 in accordance with Embodiment 19 will be described.

In the heat pump water heater 72 in accordance with Embodiment 19, when a drive voltage Cd is applied from the motor control apparatus 40 to the brushless motor of the compression mechanism 42, the compression mechanism 42 is driven. High-temperature refrigerant obtained by compression at the compression mechanism 42 is circulated in the direction indicated by arrows D. Hence, the high-temperature refrigerant is supplied from the comparison mechanism 42 to the water heat exchanger 78 via the refrigerant pipe 79. In addition, when the pump 88 in the water circulation passage is driven, water is supplied from the hot-water storage tank 82 to the water heat exchanger 78.

At this time, heat exchange is carried out between the high-temperature refrigerant and the water supplied from the hot-water storage tank 82, whereby heat is transferred from the refrigerant to the water. Hence, the water supplied to the water heat exchanger 78 is heated, and the heated water is supplied to the hot-water storage tank 82. At this time, the temperature of the heated water is monitored by the condensation temperature sensor 78*a*.

In addition, the refrigerant in the water heat exchanger 78 is condensed by heat exchange and liquefied. The flow rate of the liquid refrigerant obtained by the condensation is throttled by the throttle device 77, whereby the refrigerant expands and is supplied to the air heat exchanger 76.

In the heat pump water heater 72 in accordance with Embodiment 19, the air heat exchanger 76 operates as an evaporator. The air heat exchanger 76 absorbs heat from the outdoor air sent by the blower 76*a* and evaporates the low-temperature refrigerant. At this time, the temperature of the ambient atmosphere of the air heat exchanger 76 is monitored by the temperature sensor 76*b*.

In addition, in the refrigeration cycle unit 73, when the air heat exchanger 76 is frosted, the defrosting bypass valve 81 opens, the high-temperature refrigerant is supplied to the air heat exchanger 76 via the defrosting bypass pipe 80. Hence, the air heat exchanger 76 is defrosted.

On the other hand, hot water is supplied from the water heat exchanger 78 of the refrigeration cycle unit 73 to the hot-water storage unit 74 via the water pipes 74*a* and 75*a*. The hot water supplied to the hot-water storage unit 74 is stored in the hot-water storage tank 82. The hot water stored in the hot-water storage tank 82 is supplied to the outside through the hot-water supply pipe 85 as necessary. In particular, in the case when the hot water is supplied to the bathtub, the hot water stored in the hot-water storage tank 82 is supplied to the bathtub through the bathtub-use hot-water supply pipe 84.

Furthermore, in the case when the amount of the water or hot water stored in the hot-water storage tank 82 becomes a constant value or less, water is replenished from the outside through the water supply pipe 83.

In the heat pump water heater 72 in accordance with Embodiment 19, the command rotation speed of the brushless motor 3 is determined by the motor control apparatus 40 on the basis of a target hot-water temperature set at the heat pump water heater 72, the temperature of the water supplied to the water heat exchanger 78 and the outdoor air temperature. In the heat pump water heater 72 in accordance with Embodiment 19, the rotation speed of the brushless motor 3 of the compression mechanism 42 is controlled by the motor control apparatus 40 on the basis of the command rotation speed, just as in the case of the aforementioned Embodiment 13. As a result, in the heat pump water heater 72 in accordance with Embodiment 19, hot water having the target temperature can be supplied securely.

Since the motor control apparatus 40 being made compact in size and light in weight is used for the heat pump water heater 72 in accordance with Embodiment 19 as described above, the heat pump water heater 72 can be made smaller and lighter than a conventional heat pump water heater. Hence, in the heat pump water heater in accordance with the present invention, ease of installation is enhanced owing to downsizing and also enhanced owing to weight reduction. Furthermore, the cost of the heat pump water heater in accordance with the present invention can be made lower significantly than that of the conventional heat pump water heater, whereby the heat pump water heater is further beneficial to the user.

In the heat pump water heater 72 in accordance with Embodiment 19 of the present invention, the motor control apparatus 40 for driving and controlling the brushless motor 3 may be any one of the motor control apparatuses explained in the descriptions of the aforementioned Embodiments 1 to 11.

The present invention explained in the descriptions of Embodiments 1 to 19 is applicable not only to the motor control apparatus to be installed in the appliances mentioned in the descriptions of the aforementioned embodiments, but also to other motor control apparatuses for driving brushless motors by using inverter circuits. By making the motor control apparatus smaller and lighter, the degrees of freedom of design of any corresponding appliances can be enhanced, and the appliances can be provided at lower cost, whereby the effect of the present invention is very significant.

The significance of the effect will be described with respect to an air conditioner and a compressor incorporated in the air conditioner.

Most of the air conditioners for household use being sold in Japan are inverter-controlled and highly energy-saving in comparison with air conditioners that are not inverter-controlled. Hence, the power consumption of an air conditioner being sold in Japan is about half the power consumption of an air conditioner produced ten years ago. Inverter-controlled air conditioners have penetrated widely in Japan. However, from a worldwide point of view, a large majority of air conditioners are not inverter-controlled. It is therefore desired that air conditioners available in the world should be inverter-controlled, from the view point of promoting energy saving and global environmental preservation.

In Japan, commercial products in the form of air conditioners incorporating compressors are prevalent. However, in countries other than Japan, commercial products are frequently distributed as discrete compressors. In the markets of such discrete compressors, compressors being equal to or smaller in size than conventional compressors are demanded. Hence, if a compressor becomes larger in size than the conventional compressor by the addition of an inverter circuit, the compressor cannot gain market acceptance. It is thus difficult to make compressors in the world inverter-controlled and to promote energy saving. Hence, it is necessary to provide a compressor incorporating an inverter, being equal to a conventional compressor in performance and being equal to or smaller in size than the conventional compressor.

As described above, the present invention can provide a motor control apparatus configured without using an inductor for improving power factor and a smoothing capacitor having a large capacitance, that is, large components incorporated in a conventional motor control apparatus. Hence, the present invention can provide a compressor incorporating a compact motor control apparatus, being equal to or smaller in size than the conventional compressor. The present invention can thus promote worldwide energy saving and can be significantly beneficial to global environmental preservation.

In the descriptions of each of the above-mentioned embodiments, a configuration in which an AC voltage supplied is rectified and input to an inverter circuit is taken as an example. However, the present invention is not limited to this kind of configuration. In the present invention, even if a fluctuating voltage is input to the inverter circuit, the voltage is converted into a desired voltage by the inverter circuit and output to a brushless motor. For example, in the case when a plurality of loads are connected to one DC power source, just as in the case of vehicle-mounted brushless motors, the output voltage of the DC power source fluctuates depending on the operation conditions of the loads. Even if this fluctuating DC power source is connected to the motor control apparatus in accordance with the present invention, the voltage is converted into a desired voltage by the inverter circuit. Hence, the motor control apparatus can drive the corresponding brushless motor accurately.

The motor control apparatus in accordance with the present invention can also be applied to a vehicle-mounted air conditioner driven by a brushless motor. The motor control apparatus in accordance with the present invention is beneficial to a vehicle whose engine is stopped during vehicle stop and is started at vehicle start, for example, an idling stop vehicle or the like in which engine idling is stopped during vehicle stop. When the engine is started, the voltage of the power source drops instantaneously. However, in the case when the motor control apparatus in accordance with the present invention is mounted on the compressor of a vehicle-mounted air conditioner, the voltage applied to the brushless motor thereof can be adjusted even when the voltage of the power source drops instantaneously at engine start. Hence, the brushless motor is not stopped temporarily, whereby the vehicle-mounted air conditioner can be operated continuously. As described above, the motor control apparatus in accordance with the present invention is particularly beneficial to a vehicle or the like whose engine is stopped during vehicle stop and is started at vehicle start, for example, an idling stop vehicle or the like in particular.

In addition, the method of detecting the phase by using the current supplied to a brushless motor without using a position sensor in each of the aforementioned embodiments is explained by using the aforementioned method described in the thesis "Control of a sensorless salient-pole brushless DC motor on the basis of estimation of speed electromotive force" by Takeshita, Ichikawa, Lee and Matsui, Thesis Journal, Vol. 117-D, No.1, pages 98 to 104, issued by the Institute of Electrical Engineers of Japan in 1997. However, the present invention is not limited to this method. Any method wherein the phase is detected by using the current supplied to a brushless motor can be applied to the present invention.

As clarified by the detailed descriptions of the aforementioned embodiments, the present invention has the following effects.

The present invention can provide a compact motor control apparatus whose rectifying circuit can be made smaller and which can have a configuration with a position sensor and a configuration with no position sensor.

In addition, the present invention can provide a motor control apparatus capable of carrying out sensorless drive of a brushless motor without stopping voltage application to the brushless motor even if the input voltage to the inverter circuit pulsates significantly.

Furthermore, the present invention can provide a motor control apparatus capable of continuously carrying out voltage application without stopping voltage application to the motor even when the DC-side voltage of the inverter circuit is low.

Still further, in accordance with the present invention, even in the case when sensorless drive wherein the rotor phase information of a brushless motor is not obtained from a position sensor is carried out, voltage application can be carried out continuously without stopping voltage application to the motor. Hence, the phase of the motor can be estimated, whereby the present invention can provide a motor control apparatus capable of driving a brushless motor without using a position sensor.

Still further, in accordance with the present invention, errors unnecessary for a control apparatus for current control are not superimposed, whereby unnecessary motor current does not flow and the accuracy of sensorless estimation can be enhanced. It is thus possible to provide a motor control apparatus having high accuracy and stability.

Still further, the present invention can provide a motor control apparatus capable of significantly enhancing the output torque of a motor without using a smoothing capacitor having a large capacitance in the rectifying circuit of the motor control apparatus. In the motor control apparatus in accordance with the present invention, even when the input voltage of the inverter circuit pulsates and a desired voltage cannot be applied to the motor, the phase of the voltage applied to the motor can be maintained. Hence, it is possible to reduce wasteful motor current and to decrease motor stop owing to overcurrent.

Still further, the motor control apparatus in accordance with the present invention can carry out accurate phase estimation. Hence, the motor control apparatus can carry out sensorless motor drive and can be applied to compressors for air conditioners, refrigerators, etc.

Still further, in accordance with the present invention, motor-current follow-up performance can be enhanced. Hence, the present invention can provide a motor control apparatus having high efficiency, generating reduced noise and enhancing the output torque of a motor.

Still further, the present invention can provide a motor control apparatus capable of being configured without using an inductor for improving power factor and a smoothing capacitor having a large capacitance, that is, large components incorporated in a conventional motor control apparatus. Hence, the present invention can provide a compressor incorporating a motor control apparatus, being equal to or smaller in size than a conventional compressor. The present invention can thus promote worldwide energy saving and can be significantly beneficial to global environmental preservation.

Still further, in the motor control apparatus in accordance with the present invention, in the case when the output voltage of the single-phase AC power source is low to the extent that the voltage applied to a brushless motor becomes insufficient, the input voltage of the inverter circuit can be boosted. Hence, the present invention can provide a motor control apparatus capable of raising the maximum rotation speed of the brushless motor and significantly extending the operation range of the motor.

Still further, in accordance with the present invention, the waveform of the current flowing to the single-phase AC power source becomes nearly sinusoidal by operating the boosting circuit and the boosting circuit control section. Hence, the power factor of the power source becomes nearly one. The present invention can thus provide a motor control apparatus not adversely affecting the power source system.

Still further, in the motor control apparatus in accordance with the present invention, the capacitance of one of the two capacitors of the double-voltage rectifying boosting circuit thereof can be made smaller, whereby the double-voltage rectifying boosting circuit can be made smaller than a conventional double-voltage rectifying circuit.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. A motor control apparatus comprising:
   an inverter circuit which receives a fluctuating voltage, converts said voltage into a desired voltage and outputs said desired voltage to a brushless motor, and
   a control section which receives the input voltage to said inverter circuit, a motor current flowing to said brushless motor and a command value indicating the value of a current required to flow to said inverter circuit and generates sinusoidal voltage command values for controlling said inverter circuit, said control section maintaining the phase of the voltage applied to said brushless motor when the value of the input voltage to said inverter circuit is smaller than the value of a voltage required to be applied to said brushless motor.

2. A motor control apparatus in accordance with claim 1, wherein said control section estimates the rotation phase of said brushless motor on the basis of the current of said brushless motor.

3. A compressor incorporating said motor control apparatus in accordance with claim 2.

4. An air conditioner incorporating said motor control apparatus in accordance with claim 2.

5. A refrigerator incorporating said motor control apparatus in accordance with claim 2.

6. An electric washing machine incorporating said motor control apparatus in accordance with claim 2.

7. An electric dryer incorporating said motor control apparatus in accordance with claim 2.

8. A heat pump water heater incorporating said motor control apparatus in accordance with claim 2.

9. A motor control apparatus in accordance with claim 1, wherein said control section stops integral control when the voltage value across said inverter circuit is smaller than a voltage command value to be applied to said brushless motor.

10. A motor control apparatus in accordance with claim 1, wherein said control section calculates a voltage command value by using a calculation equation having a noninteracting term.

11. A motor control apparatus in accordance with claim 1, wherein said control section detects the voltage of said inverter circuit, estimates a voltage to be applied to said inverter circuit at the next control cycle and controls said inverter circuit.

12. A motor control apparatus in accordance with claim 1, incorporating a capacitor having a capacitance in said inverter circuit, wherein a capacitance of $C \geq 10^{-10}$ and $C \leq 2 \times 10^{-7} \times P$ of said capacitor is established, assuming that the capacitance of said capacitor is C[F] and that the maximum output of said motor is P[W].

13. A motor control apparatus in accordance with claim 12, incorporating an inductor having a inductance on the input side of said inverter circuit, wherein an inductance of $L \geq 10^{-8}$ and $L \leq 9 \times 10^{-9}/C$ is established, assuming that the inductance of said inductor is L[H] and that the capacitance of said capacitor is C[F].

14. A motor control apparatus in accordance with claim 13, wherein an inductance of $L \geq 10^{-8}$ and $L \leq P \times 10^{-6}$ established, assuming that the inductance of said inductor is L[H] and that the maximum output power of said motor is P[W].

15. A motor control apparatus in accordance with claim 1, further comprising:
   a boosting circuit having an inductor, diodes, switching devices and a capacitor, and
   a boosting circuit control section for controlling said boosting circuit, wherein said boosting circuit control section determines the duty value of said switching device on the basis of a signal from said control section.

16. A motor control apparatus in accordance with claim 15, wherein said boosting circuit control section, which is configured to receive the detected voltage phase and AC current of an AC power source, comprises:

an AC current command section that outputs an AC current command value on the basis of said detected phase and a control signal from said control section, and a PWM command generation section that generates PWM command values for driving said switching devices on the basis of said AC current command value and said detected AC current of said AC power source and outputs said PWM command values.

17. A motor control apparatus in accordance with claim 1, further comprising:

a boosting circuit having an inductor to which a fluctuating voltage is input, a plurality of diodes forming a rectifying circuit, switching devices connected to said rectifying circuit and performing ON/OFF operation, and a capacitor outputting a boosted voltage, and a boosting circuit control section for controlling said boosting circuit.

18. An air conditioner incorporating said motor control apparatus in accordance with claim 1.

19. A refrigerator incorporating said motor control apparatus in accordance with claim 1.

20. An electric washing machine incorporating said motor control apparatus in accordance with claim 1.

21. An electric dryer incorporating said motor control apparatus in accordance with claim 1.

22. A blower incorporating said motor control apparatus in accordance with claim 1.

23. An electric vacuum cleaner incorporating said motor control apparatus in accordance with claim 1.

24. A heat pump water heater incorporating said motor control apparatus in accordance with claim 1.

* * * * *